US009005561B2

(12) United States Patent
Leta et al.

(10) Patent No.: US 9,005,561 B2
(45) Date of Patent: Apr. 14, 2015

(54) SELECTIVE SULFUR REMOVAL PROCESS

(75) Inventors: Daniel P. Leta, Flemington, NJ (US);
Preeti Kamakoti, Summit, NJ (US);
Jack W. Johnson, Clinton, NJ (US);
Peter I. Ravikovitch, Princeton, NJ (US); Harry Deckman, Clinton, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 13/406,100

(22) Filed: Feb. 27, 2012

(65) Prior Publication Data

US 2012/0308456 A1    Dec. 6, 2012

Related U.S. Application Data

(60) Provisional application No. 61/447,824, filed on Mar. 1, 2011, provisional application No. 61/477,806, filed on Apr. 21, 2011, provisional application No. 61/477,812, filed on Apr. 21, 2011, provisional (Continued)

(51) Int. Cl.
*B01D 53/14* (2006.01)
*B01D 53/047* (2006.01)
(Continued)

(52) U.S. Cl.
CPC .......... *B01D 53/047* (2013.01); *B01D 53/0438* (2013.01); *B01D 53/0462* (2013.01);
(Continued)

(58) Field of Classification Search
None
See application file for complete search history.

(56) References Cited

U.S. PATENT DOCUMENTS 2,989,383 A    6/1961   Miller
3,594,983 A    7/1971   Yearout
(Continued)

FOREIGN PATENT DOCUMENTS

CN    101475430 A    7/2009
EP    1 421 986 B1    5/2004
(Continued)

OTHER PUBLICATIONS

Helen Y. Huang and Ralph T. Yang, Daniel Chinn and Curtis L. Munson, Ind. Eng. Chem. Res. 2003, 42, 2427-2433, "Amine-Grafted MCM-48 and Silica Xerogel as Superior Sorbents for Acidic Gas Removal from Natural Gas".*

(Continued)

*Primary Examiner* — Jennifer A Smith
*Assistant Examiner* — Anita Nassiri Motlagh
(74) *Attorney, Agent, or Firm* — Andrew T. Ward; David M. Weisberg; Malcolm D. Keen

(57) ABSTRACT

A cyclic process for selectively separating hydrogen sulfide from a gas mixture including $CO_2$ is operated by contacting the gas mixture under sorption conditions with a non-aqueous sorbent comprising a basic non-protogenic nitrogenous compound to react the $H_2S$ with the basic compound so that the $H_2S$ can be sorbed by the compound. The compound containing the sorbed $H_2S$ can then be subjected to desorption conditions by which the $H_2S$ is desorbed and the sorbent readied for another sorption step in the cycle. The basic nitrogenous compound can be carried on a porous solid sorbent, e.g., a solid oxide such as alumina, silica, silica-alumina, zeolites, or a mesoporous and/or macroporous solid oxide. The process may be operated using a pressure swing, temperature swing, partial pressure swing, purge displacement, or a combination thereof between the sorption and desorption portions of the cycle, preferably in a rapid cycle operation.

20 Claims, 7 Drawing Sheets

Related U.S. Application Data application No. 61/447,848, filed on Mar. 1, 2011, provisional application No. 61/477,869, filed on Apr. 21, 2011, provisional application No. 61/477,835, filed on Apr. 21, 2011, provisional application No. 61/477,877, filed on Apr. 21, 2011.

(51) Int. Cl.

| B01D 53/04 | (2006.01) |
|---|---|
| C10L 3/10 | (2006.01) |
| B01J 20/18 | (2006.01) |
| B01J 20/20 | (2006.01) |
| B01J 20/22 | (2006.01) |
| B01J 20/34 | (2006.01) |
| B01J 20/28 | (2006.01) |
| B01D 53/52 | (2006.01) |
| C01B 17/04 | (2006.01) |
| C01B 17/16 | (2006.01) |

(52) U.S. Cl.
CPC ............ *B01D53/0473* (2013.01); *C10L 3/103* (2013.01); *C10L 3/104* (2013.01); *B01J 20/18* (2013.01); *B01J 20/186* (2013.01); *B01J 20/20* (2013.01); *B01J 20/226* (2013.01); *B01J 20/3408* (2013.01); *B01J 20/3416* (2013.01); *B01J 20/3483* (2013.01); *B01J 20/3491* (2013.01); *B01J 20/28057* (2013.01); *B01J 20/28042* (2013.01); *B01J 20/28078* (2013.01); *B01D 53/526* (2013.01); *C01B 17/0408* (2013.01); *C01B 17/167* (2013.01); *C10L 3/105* (2013.01); *B01D 2252/20431* (2013.01); *B01D 2256/245* (2013.01); *B01D 2257/7022* (2013.01); *B01J 2220/42* (2013.01); *B01J 2220/46* (2013.01); *B01J 2220/56* (2013.01); *B01D 2253/102* (2013.01); *B01D 2253/108* (2013.01); *B01D 2253/1085* (2013.01); *B01D 2253/116* (2013.01); *B01D 2253/204* (2013.01); *B01D 2253/304* (2013.01); *B01D 2257/102* (2013.01); *B01D 2257/304* (2013.01); *B01D 2257/504* (2013.01); *B01D 2259/40022* (2013.01); *B01D 2259/40052* (2013.01); *B01D 2259/41* (2013.01); *Y02C 10/08* (2013.01); *B01D 2252/20436* (2013.01); *B01D 2252/20489* (2013.01); *B01D 2253/106* (2013.01); *B01D 2253/25* (2013.01); *B01D 2253/306* (2013.01); *B01D 2253/311* (2013.01); *B01D 2256/24* (2013.01); *B01D 2259/402* (2013.01); *B01D 2253/34* (2013.01)

(56) References Cited

U.S. PATENT DOCUMENTS

| 4,094,652 A | 6/1978 | Lowther |
|---|---|---|
| 4,269,611 A | 5/1981 | Anderberg |
| 4,312,641 A | 1/1982 | Verrando et al. |
| 4,329,158 A | 5/1982 | Sircar |
| 4,350,501 A | 9/1982 | Bannon |
| 4,424,837 A | 1/1984 | Farrell |
| 4,433,707 A | 2/1984 | Farnham |
| 4,702,903 A | 10/1987 | Keefer |
| 4,729,982 A | 3/1988 | Thistlethwaite et al. |
| 4,753,919 A | 6/1988 | Whittenberger |
| 4,772,579 A | 9/1988 | Thistlethwaite et al. |
| 4,801,308 A | 1/1989 | Keefer |
| 4,914,218 A | 4/1990 | Kumar et al. |
| 4,968,329 A | 11/1990 | Keefer |
| 5,057,296 A | 10/1991 | Beck |
| 5,074,892 A | 12/1991 | Leavitt |
| 5,082,473 A | 1/1992 | Keefer |
| 5,089,034 A | 2/1992 | Markovs et al. |
| 5,098,684 A | 3/1992 | Kresge et al. |
| 5,102,643 A | 4/1992 | Kresge et al. |
| 5,108,725 A | 4/1992 | Beck et al. |
| 5,141,725 A | 8/1992 | Ramprasad et al. |
| 5,171,333 A | 12/1992 | Maurer |
| 5,225,174 A | 7/1993 | Friesen et al. |
| 5,256,172 A | 10/1993 | Keefer |
| 5,516,745 A | 5/1996 | Friesen et al. |
| 5,626,033 A | 5/1997 | Tamhankar et al. |
| 5,718,872 A * | 2/1998 | Khanmamedov ............ 422/168 |
| 5,846,295 A | 12/1998 | Kalbassi et al. |
| 5,958,368 A | 9/1999 | Ryoo et al. |
| 6,051,050 A | 4/2000 | Keefer et al. |
| 6,063,161 A | 5/2000 | Keefer et al. |
| 6,077,457 A | 6/2000 | Friesen et al. |
| 6,080,226 A | 6/2000 | Dolan et al. |
| 6,136,222 A | 10/2000 | Friesen et al. |
| 6,197,092 B1 | 3/2001 | Butwell et al. |
| 6,293,998 B1 | 9/2001 | Dolan et al. |
| 6,315,817 B1 | 11/2001 | Butwell et al. |
| 6,406,523 B1 | 6/2002 | Connor et al. |
| 6,475,265 B1 | 11/2002 | Baksh et al. |
| 6,514,318 B2 | 2/2003 | Keefer |
| 6,607,584 B2 | 8/2003 | Moreau et al. |
| 6,629,525 B2 | 10/2003 | Hill et al. |
| 6,651,658 B1 | 11/2003 | Hill et al. |
| 6,652,627 B1 | 11/2003 | Tonkovich et al. |
| 6,691,702 B2 | 2/2004 | Appel et al. |
| 7,049,259 B1 | 5/2006 | Deckman et al. |
| 7,231,784 B2 | 6/2007 | Howard et al. |
| 7,270,792 B2 | 9/2007 | Deckman et al. |
| 7,491,250 B2 | 2/2009 | Hershkowitz et al. |
| 7,507,274 B2 | 3/2009 | Tonkovich et al. |
| 7,524,358 B2 | 4/2009 | Saxena et al. |
| 7,527,670 B2 | 5/2009 | Ackley et al. |
| 7,799,730 B2 | 9/2010 | Ringer et al. |
| 7,803,215 B2 | 9/2010 | Russell et al. |
| 7,938,886 B2 | 5/2011 | Hershkowitz et al. |
| 7,959,720 B2 | 6/2011 | Deckman et al. |
| 2003/0015093 A1 | 1/2003 | Wegeng et al. |
| 2003/0116016 A1 | 6/2003 | Monzyk et al. |
| 2005/0045030 A1 | 3/2005 | Tonkovich et al. |
| 2006/0075777 A1 | 4/2006 | Howard et al. |
| 2006/0102519 A1 | 5/2006 | Tonkovich et al. |
| 2006/0162556 A1 | 7/2006 | Ackley et al. |
| 2006/0165574 A1 | 7/2006 | Sayari |
| 2006/0210454 A1 | 9/2006 | Saxena et al. |
| 2006/0249020 A1 | 11/2006 | Tonkovich et al. |
| 2007/0085227 A1 | 4/2007 | Tonkovich et al. |
| 2007/0240449 A1 | 10/2007 | Howard et al. |
| 2007/0246106 A1 | 10/2007 | Tonkovich et al. |
| 2008/0028286 A1 | 1/2008 | Chick |
| 2008/0282884 A1 | 11/2008 | Kelley et al. |
| 2008/0282885 A1 | 11/2008 | Deckman et al. |
| 2008/0282886 A1 | 11/2008 | Reyes et al. |
| 2008/0282887 A1 | 11/2008 | Chance et al. |
| 2008/0282892 A1 | 11/2008 | Deckman et al. |
| 2008/0314245 A1 | 12/2008 | Hershkowitz et al. |
| 2009/0151562 A1 | 6/2009 | Russell et al. |
| 2009/0211441 A1 | 8/2009 | Reyes et al. |
| 2009/0217691 A1 | 9/2009 | Schmidt et al. |
| 2009/0294348 A1 | 12/2009 | Krogue et al. |
| 2009/0308248 A1 | 12/2009 | Siskin et al. |
| 2009/0326279 A1 | 12/2009 | Tonkovich et al. |
| 2010/0251887 A1 | 10/2010 | Jain |
| 2010/0263534 A1 | 10/2010 | Chuang |
| 2010/0292072 A1* | 11/2010 | Gray et al. ................. 502/56 |
| 2010/0326272 A1 | 12/2010 | Asaro et al. |

FOREIGN PATENT DOCUMENTS

| EP | 1080771 B1 | 10/2007 |
|---|---|---|
| JP | 2000317244 A | 11/2000 |
| JP | 2002326810 A | 11/2002 |
| WO | 92/05859 | 4/1992 |
| WO | 96/14917 | 5/1996 |
| WO | 02/087730 A2 | 11/2002 |

(56) References Cited

FOREIGN PATENT DOCUMENTS

| WO | 2005/061100 A1 | 7/2005 |
|---|---|---|
| WO | 2008/000380 A1 | 1/2008 |
| WO | 2008/143826 A1 | 11/2008 |
| WO | 2008/143966 A1 | 11/2008 |
| WO | 2009/105251 A1 | 8/2009 |
| WO | 2010/064121 A8 | 6/2010 |
| WO | 2010/096916 A1 | 9/2010 |
| WO | 2010/130787 A1 | 11/2010 |

OTHER PUBLICATIONS

Ruthven, D. M., Thaeron, C. "Performance of a parallel passage adsorbent contactor", Separation and Purification Technology, vol. 12 (1997), pp. 43-60.

Suib, Steven L, O'Young, Chi-Lin "Synthesis of Octahedral Molecular Sieves and Layered Materials", Marcel Dekker, Inc., vol. 69 (1997), pp. 215-231.

Zhao, Dongyuan, Feng, Jianglin, Huo, Qishing, Melosh, Nicholas, Fredrickson, Glenn H., Chmelka, Bradley F., Stucky, Galen D. "Triblock Copolymer Syntheses of Mesoporous Silica with Periodic 50 to 300 Angstrom Pores", Science, vol. 279 (Jan. 23, 1998), pp. 548-552.

Zamani, Cyrus, Illa, Xavi, Abdollahzadeh-Ghom, Sara, Morante, J. R., Rodriguez, Albert Romano "Mesoporous Silica: A Suitable Adsorbent for Amines", Nanoscale Res Lett, vol. 4 (2009), pp. 1303-1308.

Santos, Monica S., Grande, Carlos A., Rodrigues, Alirio E. "New cycle configuration to enhance performance of kinetic PSA processes", Chemical Engineering Science 66 (2011) pp. 1590-1599.

Rezaei F. et al.: "Structured absorbents in gas separation processes". Separation and Purification Technology, Elsevier Science, Amsterdam, NL, vol. 70, No. 3, Jan. 12, 2012, pp. 243-256, ISSN: 1383-5866.

* cited by examiner

H₂S and CO₂ Isotherms of TBD on MCM-48

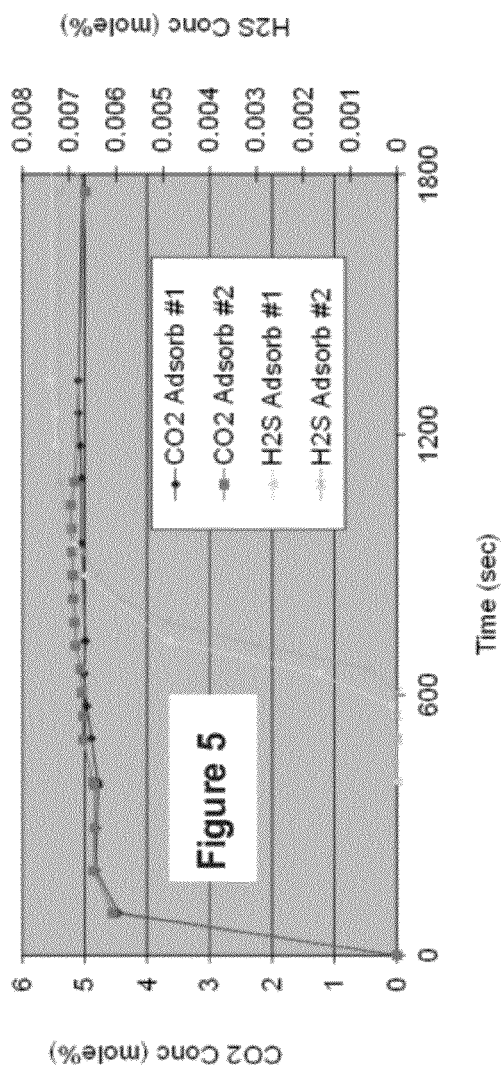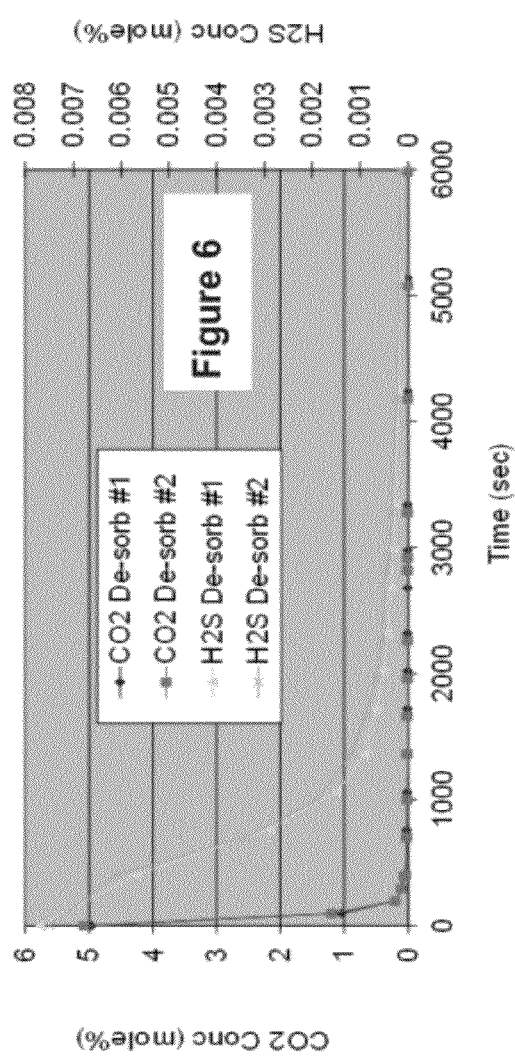

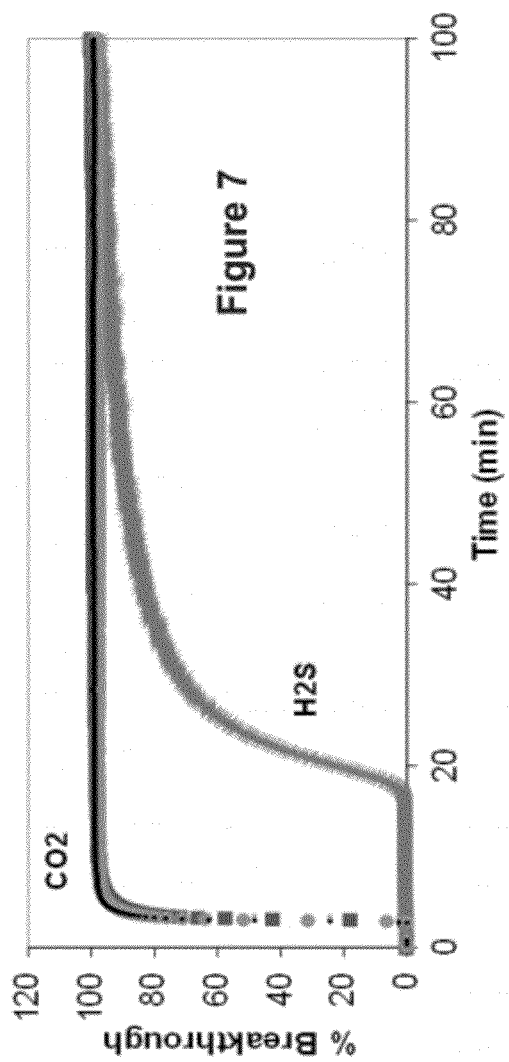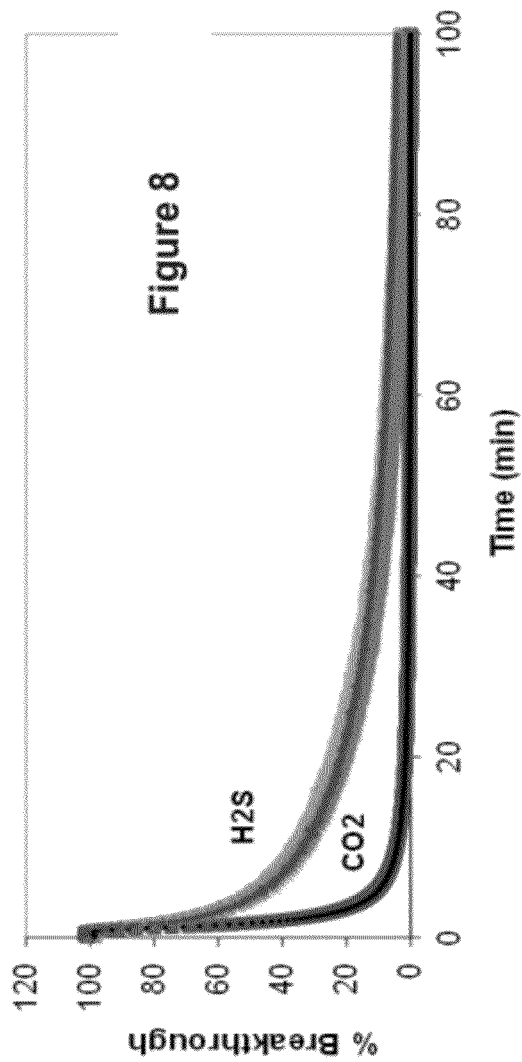

SELECTIVE SULFUR REMOVAL PROCESS

CROSS-REFERENCE TO RELATED APPLICATION

This application claims priority to U.S. Provisional Ser. No. 61/447,824 filed Mar. 1, 2011, herein incorporated by reference in its entirety. This application further claims priority to related U.S. Ser. Nos. 61/447,806, 61/447,812, 61/447,877, 61/447,848, 61/447,869, and 61/447,835, each filed Mar. 1, 2011, and each being incorporated by reference herein in its entirety, as well as the six U.S. non-provisional applications filed on even date herewith and claiming priority thereto, each of which being additionally incorporated by reference herein in their entirety.

This application is further related to U.S. Ser. Nos. 61/448,117, 61/448,120, 61/448,121, 61/448,123, and 61/448,125, each filed Mar. 1, 2011, 61/594,824 filed Feb. 3, 2012, and the application entitled "Apparatus and Systems having a Rotary Valve Assembly and Swing Adsorption Processes Related Thereto" by Robert F. Tammera et al. filed on even date herewith, each being incorporated by reference herein in its entirety, as well as any U.S. non-provisional applications claiming priority thereto and presumably filed on even date herewith, each of which being additionally incorporated by reference herein in their entirety.

FIELD OF THE INVENTION

This invention relates to a process for selectively removing acidic sulfur-containing gases from mixed gas streams.

BACKGROUND OF THE INVENTION

Natural gas from many gas fields, which is often produced at high pressures, possibly as high as 50 MPa, can contain significant levels of $H_2O$, $H_2S$, $CO_2$, $N_2$, mercaptans, and/or heavy hydrocarbons that have to be removed to various degrees before the gas can be transported to market. It is preferred that as much of the acid gases $H_2S$ and $CO_2$ be removed from natural gas as possible to leave methane as the recovered component. Small increases in recovery of this light component can result in significant improvements in process economics and also serve to prevent unwanted resource loss. It is desirable to recover more than 80 vol %, preferably more than 90 vol %, of the methane when detrimental impurities are removed. In many instances effective removal of the $H_2S$ is more important than $CO_2$ removal as specifications for natural gas transmission pipelines typically limit the $H_2S$ content to be as low as 4 vppm while a more relaxed specification of two to three percent is typically permissible for $CO_2$. If the contaminant removal process is unselective between these two gases or favorable to $CO_2$ removal, the treatment will be unnecessarily severe, resulting in increased processing costs. A natural gas treatment process which is selective for $H_2S$ relative to $CO_2$ is therefore economically attractive.

Natural gas treating is often carried out using solid sorbents such as activated charcoal, silica gel, activated alumina, or various zeolites. The well-established pressure swing adsorption (PSA) process has been used in this way since about the 1960s. In the PSA process, the solid sorbent is contained in a vessel and adsorbs the contaminant gas species at high pressure and when the design sorption capacity of the sorbent is attained the gas stream is switched to another sorption vessel while the pressure in the first vessel is reduced to desorb the adsorbent component. A stripping step with inert (non-reactive) as or with treated product gas may then follow before the vessel is returned to the sorption portion of the cycle. Variants of the conventional PSA (cPSA) process have been developed including the partial pressure swing or displacement purge adsorption (PPSA), rapid cycle pressure swing adsorption (RCPSA), Dual Bed (or Duplex) PSA Process, and rapid cycle partial pressure swing or displacement purge adsorption (RCPPSA) technologies.

Temperature swing adsorption (TSA) provides an alternative to the pressure swing technology in which the sorbed component is desorbed by an increase in temperature typically achieved by the admission of high temperature gas, e.g., air, to the vessel in the regeneration phase. Rapid cycle thermal swing adsorption (RCTSA) is a variant of the conventional TSA process using short cycles, typically less than two minutes. TSA processes are generally available commercially from a number of technology suppliers, although the state of the art for large scale rapid cycle TSA units is considerably less advanced. Large scale slow (~10 hr) cycle internally heated TSA's have been used in natural gas processing for rigorous dehydration and mercaptan removal. In an internally heated thermal swing adsorption process, the gas or fluid used to heat the contactor directly contacts the adsorbent material. As such, the gas or fluid used to heat the contactor during regeneration can pass through the same channels that the feed gas does during the adsorption step. Externally heated thermal swing adsorption processes employ contactors having a separate set of channels to carry gases or fluids used to heat and cool the contactor so that gases used to heat and cool the contactor do not mix with the adsorbent that contacts the feed gas.

Other gas streams containing similar contaminants are encountered in various industrial processes, notably in petroleum refining and in petrochemical processes. In petroleum refining, for example, hydrodesulfurization processes utilize separation processes which remove the hydrogen sulfide formed in the process from the circulating stream of hydrogen. Conventionally, amine scrubbers are used for this purpose, using liquid amine sorbents such as monoethanolamine (MEA), diethanolamine (DEA), triethanolamine (TEA), methyldiethanolamine (MDEA), and diisopropylamine (DIPA) in the form of an aqueous solution.

Conventionally, liquid sorbent systems such as used in hydrogen sulfide scrubbing operate on a closed cycle with separate sorption and regeneration vessels through which the liquid sorbent is continuously circulated in a sorption-regeneration loop in which the sorption is typically carried out at a temperature optimized for sorption of the contaminant and the regeneration carried out by stripping, usually by steam at a higher temperature, in the regeneration tower. Inert gas stripping is also potentially useful to remove the sorbed contaminant species.

The capture of $CO_2$ by amine species takes place through the formation of carbamate salts for primary and secondary amines, and additionally through the formation of ammonium bicarbonate salts when water is present. When tertiary amines are utilized with water present the formation of carbamate salts which require a proton transfer cannot take place and the reactions are limited to the formation of bicarbonate salts in a reaction sequence which with requires $H_2O$ to be present. In the absence of water, tertiary and other non-protogenic basic nitrogen species do not react with $CO_2$, as no bicarbonate formation is possible. Hydrogen sulfide ($H_2S$) is a Brønsted acid, and it reacts with all sufficiently basic amine species, including tertiary or non-protogenic amines, amidines, guanidines, and biguanides through simple acid/base reactions by the transfer of a proton from the $H_2S$ to the amine species to form ammonium sulfide (trisubstituted ammonium sulfide salts in the case of tertiary amines) reversibly, both in the presence and absence of water.

SUMMARY OF THE INVENTION

We have now devised a cyclic process for the selective sorption of hydrogen sulfide from gas mixtures containing $CO_2$ and possibly other acid gases including $CO_2$, $SO_2$, and other gaseous components such as $N_2$, mercaptans, and/or heavy hydrocarbons. This process utilizes the selective reaction of $H_2S$ with tertiary and other non-protogenic Lewis bases in non-aqueous systems.

According to the present invention, the process for selectively separating hydrogen sulfide from a gas mixture including $CO_2$ comprises contacting the gas mixture under sorption conditions with a non-aqueous sorbent comprising a basic non-protogenic nitrogenous compound to react the $H_2S$ with the basic compound so that the $H_2S$ is sorbed by the compound. The compound containing the sorbed $H_2S$ can then be subjected to desorption conditions by which the $H_2S$ is desorbed and the sorbent readied for another sorption step in the cycle.

The basic non-protogenic nitrogenous compound can advantageously be carried on a porous solid sorbent such as those which have conventionally been used for gas purification and separation processes, e.g., solid oxides (including mixed oxides) such as alumina, silica, silica-alumina, and/or acidic or non-acidic zeolites. Mesoporous and macroporous materials having a high surface area are preferred.

The process may be operated on a pressure swing and/or temperature swing between the sorption and desorption portions of the cycle. The present process is amenable to being operated in variants such as partial pressure swing or displacement purge adsorption (PPSA), Dual Bed (or Duplex) PSA with preference given to the rapid cycle variants such as rapid cycle PSA (RCPSA), rapid cycle partial pressure swing or displacement purge adsorption (RCPPSA) technologies, and thermal swing processes with preference being given to rapid cycle temperature swing Adsorption (RCTSA).

The process is especially useful for selectively separating $H_2S$ from a stream in which $H_2S$ and $CO_2$ are the major constituents, e.g., a stream resulting from a non-selective separation process in which these two contaminants have been removed in a pre-separation step from a natural gas stream. Pre-separated streams of this type will typically contain at least 50 mol %, for example at least 80 mol % or even at least 90 mol %, combined $H_2S$ and $CO_2$. It may also be used to separate $H_2S$ and $CO_2$ individually from a natural gas stream including both. With a single step separation to remove the $H_2S$ and $CO_2$, the incoming gas stream may be treated to sorb the $H_2S$ preferentially to the $CO_2$, so as to produce a product natural gas stream depleted in $H_2S$ and an $H_2S$-containing side stream, e.g., which can be passed to a Claus plant for recovery of sulfur. If the incoming stream is a natural gas stream containing significant quantities of $CO_2$ to be removed and then used (for example, for re-injection into the producing formation for pressure maintenance), the preferential desorption characteristics of the process may be utilized to form the $H_2S$-depleted product stream and a $CO_2$ re-injection stream with a reduced content of $H_2S$ which can be used for re-injection with the potential for accumulation of this contaminant in the producing formation. In this case, the incoming natural gas stream can be treated with the basic nitrogenous adsorbent so that both the $H_2S$ and the $CO_2$ are sorbed to produce a product natural gas stream in which the levels of both the $H_2S$ and the $CO_2$ are reduced. The basic nitrogenous compound containing the sorbed $H_2S$ and the $CO_2$ can then be subjected to a two-stage desorption in which the differential adsorption characteristics of basic nitrogen compound for the two contaminants are effectively exploited. In the first step of the desorption, the $CO_2$ which is less firmly bound than the $H_2S$, can be preferentially desorbed to form a side stream comprising desorbed $CO_2$. Being more firmly bound to the adsorbent, the $H_2S$ can remain bound to the adsorbent at this stage under the conditions selected. The adsorbent still containing the $H_2S$, can then pass to the second desorption step in which the conditions are selected to favor $H_2S$ desorption. The $H_2S$ desorbed in this step may then be passed to a Claus plant while the other side stream containing the desorbed $CO_2$ may be re-injected into the producing formation.

BRIEF DESCRIPTION OF THE DRAWINGS

FIGS. 5 and 6 show the sorption and desorption cycles, respectively, for the $H_2S$ breakthrough experiment of Example 6.

FIGS. 7 and 8 show the sorption and desorption cycles, respectively, for the breakthrough experiment of Example 7.

DETAILED DESCRIPTION OF THE EMBODIMENTS

Process Configuration

Figure 1:
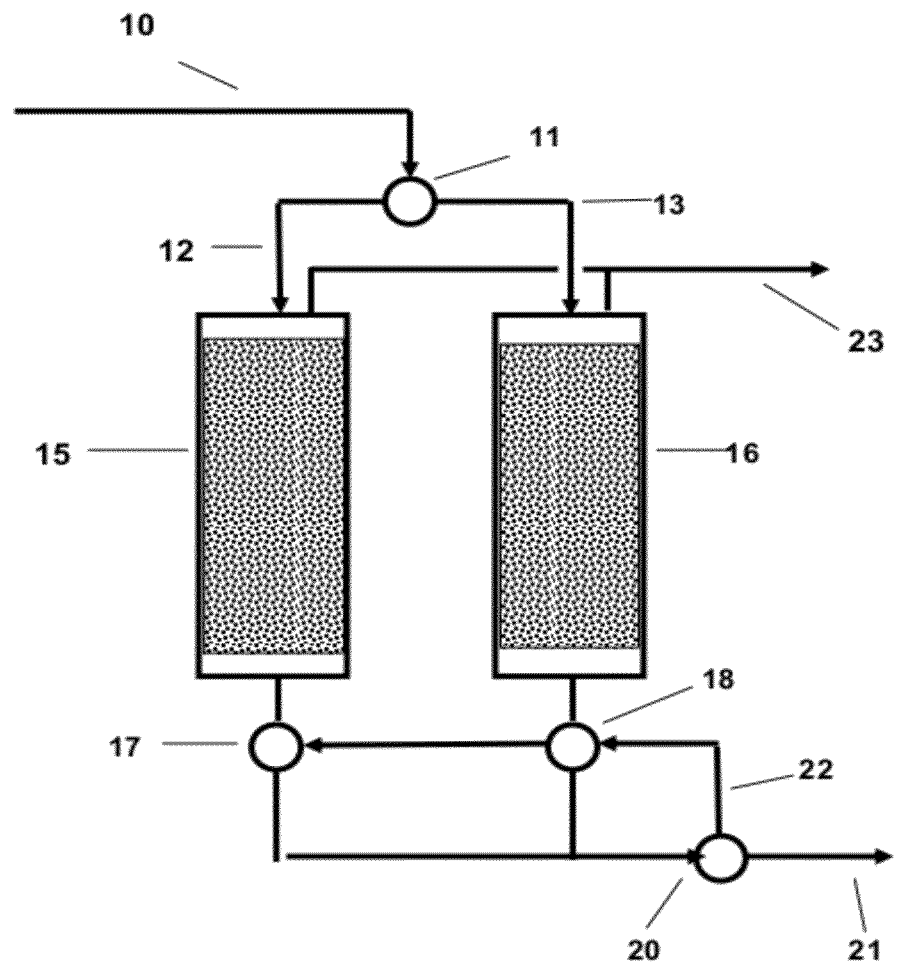
FIG. 1 of is a highly simplified schematic of a gas separation unit utilizing a non-aqueous, solid, non-protogenic, basic nitrogenous sorbent system.

A highly simplified schematic of a natural gas purification unit operating in the pressure swing adsorption mode, utilizing a non-aqueous, solid, non-protogenic, basic nitrogenous sorbent system is shown in FIG. 1. Ancillary equipment such as compressors, heaters, coolers, pressure reduction valves, and power recovery turbines are not shown, since they are typically conventional. An incoming natural gas stream containing $H_2S$ and $CO_2$, as well as possibly other contaminants such as $N_2$, $SO_2$, mercaptans, and heavier hydrocarbons ($C_{3+}$), can enter the purification unit through line 10 and pass to manifold valve 11 where it is diverted to one of two branch lines 12, 13 that conduct the incoming gas stream in turn according to a controlled cycle to one of two sorption vessels 15, 16. The sorption vessels can contain fixed beds of a solid absorbent material at least a portion of which is selective for the $H_2S$, as described below. The sorption bed can additionally or alternately contain materials that have selectivity for other species. In one preferred embodiment, the bed can be segmented with an initial portion containing the $H_2S$-selective sorbent and the final portion containing a $CO_2$-selective adsorbent. Additionally or alternately, the bed can be constructed as a parallel channel contactor. Examples of preferred bed architectures can include, but are not limited to, those provided in U.S. Pat. Nos. 7,959,720, 7,938,886, 7,731, 782, and 7,947,120, which are all incorporated herein by reference. After passing through a bed of sorption material in the bed on the sorption phase of the cycle, the purified gas can exit the respective vessel through one of two branch lines and can pass to exhaust manifold valve 17 or 18, and from there to manifold valve 20. Purified gas can leave the unit through line 21, while a portion can be recycled as a purge stream through line 22 in the reverse direction, when the sorbed contaminant $H_2S$ is to be purged from the sorption material in one of the two sorption vessels 15, 16 at the end of the sorption phase in the particular vessel. In PSA operations, the bed can advantageously be depressurized before purging, and/or in TSA operations, the bed can advantageously be heated before purging. Purge gas containing the desorbed contaminant can be exhausted from the vessels by way of line 23 and the concentrated contaminants recovered and processed.

In operation in the PSA mode, the incoming gas can be passed over the selected bed of sorption material for a fixed time controlled by a cycle controller and/or until contaminant breakthrough is indicated by a stream controller in the vessel. At this point, the manifold valves can be actuated to stop the flow of gas into and out of the vessel which has been in the sorption phase and to re-direct it to the other vessel containing freshly purged material. The manifold valves can then be controlled to allow a reduction of pressure in the vessel used for sorption so that the sorbed contaminant(s) can be selectively released from the sorption material into exhaust line 23. Desorption may be assisted, preferably towards/at the end of the pressure reduction phase, by purging with a gas stream comprised of recycle product and/or inert gas such as $N_2$, admitted by way of line 22 through valve 20. The purge stream may be heated if necessary to facilitate stripping of the sorbed contaminant(s).

Since the selectivity of the process is typically favored by operation with a non-aqueous sorbent, it can be preferable to maintain the water content of the system at a relatively low level. This, however, is not inconsistent with water in the incoming gas stream at relatively low level, for example, less than 5 mol %, preferably less than 2 mol % or less than 0.1 mol % (less than 1000 ppm), water based on the molar composition of the overall incoming gas stream. If, however, water from the gas stream tends to accumulate in the sorbent, it may be desirable to remove a slip stream of sorbent for removal of the water, e.g., by gas stripping, passing over a dryer, heating, and/or by evaporation under reduced pressure. Embodiments herein can additionally or alternately include drying the incoming feed gas to the system to remove a portion of water therefrom by means of dryers, precipitators, condensers, demisters, coalescers, and/or desiccants prior to subjecting the feed gas to the adsorbent systems described herein.

Sorbent

The sorbent used in the present process can be a basic, non-protogenic nitrogenous compound. Compounds of this type typically do not, as described above, enter into chemisorption reactions with $CO_2$ in the absence of water, although they do typically undergo reaction with $H_2S$. This differential chemical reactivity can be used to selectively separate between the sorbed $H_2S$ and $CO_2$. The sorbent may be used in liquid form and/or on a porous solid support.

A wide variety of basic nitrogen-containing compounds may be used as the essential sorbent. If desired, a combination of such compounds may be used. The requirement for the desired selectivity for $H_2S$ adsorption is that the nitrogenous groups be non-protogenic (i.e., incapable of acting as a proton donor). Such nitrogenous groups therefore cannot contain an acidic, dissociable hydrogen atom (such as a primary or secondary amine), which is a prerequisite for the formation of carbamates as a route for the $CO_2$ chemisorption reaction in the absence of water. It is not generally required that the whole compound be aprotic (though it may), but only that the nitrogen-containing groups in the compound be non-protogenic. Non-protogenic nitrogen species are also typically non-nucleophilic under prevailing reaction conditions. Suitable nitrogenous compounds can include, but are not necessarily limited to, tertiary amines such as triethylamine, triethanolamine (TEA), methyldiethanolamine (MDEA), N,N, N',N'-tetrakis(2-hydroxyethyl)ethylenediamine, as well as non-protogenic nitrogenous bases with cyclic, multicyclic, and acyclic structures, such as imines, heterocyclic imines and amines, amidines (carboxamidines) such as dimethylamidine, guanidines, triazabicyclodecenes, imidazolines, and pyrimidines. Other compounds that can additionally or alternately be used can include the N,N-di(lower alkyl)carboxamidines (where lower alkyl is preferably $C_1$-$C_6$ alkyl), N-methyltetrahydropyrimidine (MTHP), 1,8-diazabicyclo[5.4.0]undece-7-ene (DBU), 1,5,7-triazabicyclo[4.4.0]dec-5-ene (TBD), 7-methyl-1,5,7-triazabicyclo[4.4.0]dec-5-ene (MTBD), 1,5-diazabicyclo[4.3.0]non-5-ene (DBN), substituted guanidines of the formula $(R^1R^2N)(R^3R^4N)C=N-R^5$ (where $R^1$, $R^2$, $R^3$ and $R^4$ are preferably lower alkyl ($C_1$-$C_6$) and $R^5$ is preferably H or lower alkyl ($C_1$-$C_6$)) such as 1,1,3,3-tetramethylguanidine and biguanide, as well as combinations thereof. Other substituent groups on these compounds such as higher alkyl, cycloalkyl, aryl, alkenyl, and substituted alkyl and other structures may also be used.

In some embodiments, the more highly basic non-protogenic nitrogenous compounds can be preferred, since they are capable of maintaining basic conditions favoring $H_2S$ sorption. For this reason, the bases having a $pK_a$ (acid dissociation constant, as measured or predicted at 25° C. in aqueous solution or as measured in another solvent and converted to an aqueous value) of at least 9.0 can be preferred, though higher values of at least 10.0, at least 12.0, or at least 13.0 can be desirable for improved/optimal chemisorption of $H_2S$. A useful means of making an adequate prediction of the $pK_a$ value of the base may be provided by the ACD/PhysChem Suite (a suite of software tools for the prediction of basic physicochemical properties including $pK_a$), available from Advanced Chemistry Development, Inc., 110 Yonge Street, Toronto, Ontario, Canada M5C 1T4. Exemplary $pK_a$ values for a limited number compounds (in dimethylsulfoxide) may be found in the Bordwell online $pK_a$ database, http://www.chem.wisc.edu/areas/reich/pkatable/index.htm).

Solid Phase Sorbents

The process may be operated with the basic sorbent in the liquid phase, but preferably can be operated as or can include an adsorption process in which the basic sorbent is supported on a porous, solid support. To operate using a solid phase sorbent, the basic nitrogenous compound, if liquid (as most are), can be supported on a porous, solid support or carrier material, preferably of relatively high surface area. If the basic compound is a solid, it may be dissolved to form a solution which can then be used to impregnate the support material. Supports of this kind are frequently used as the catalysts in catalytic processes such as hydrogenation, hydrotreating, hydrodewaxing, etc. Common support materials can include carbon (activated charcoal) and/or porous solid oxides of metals and metalloids and mixed oxides, including alumina, silica, silica-alumina, magnesia, and zeolites, as well as combinations thereof. Porous solid polymeric materials can additionally or alternately be suitable, provided that they are resistant to the environment in which the sorption reaction is conducted. As the components of the gas stream tend to have relatively small molecular dimensions, the minimum pore size of the support may not in itself be a severely limiting factor, but, when the basic nitrogenous compound is impregnated, the entrances to the pore systems of small and intermediate pore size zeolites (such as zeolite 4A, erionite, ZSM-5, ZSM-11, and the like) may become occluded by the (bulky) amine component; for this reason, the smaller pore materials may not be preferred, especially with the bases of relatively larger molecular dimensions. Large pore size zeolites with 12-membered ring systems (such as ZSM-4, faujasites such as zeolite X and the variants of zeolite Y including Y, REY, and USY, and the like) may, however, be suitable depending on the dimensions of the basic nitrogenous compound(s) utilized. Amorphous porous solids with a range of different pore sizes may be utilized in embodiments herein, since some of the pores will have openings large enough to accept the basic component and to also allow sufficient access to the components of the gas stream. Supports containing highly acidic reaction sites, as with the more highly active zeolites, can tend to be more susceptible to fouling reactions upon reaction with the nitrogenous compound and may therefore be generally less preferred in some embodiments than the less acidic supports.

A preferred class of solid oxide support includes mesoporous and/or macroporous silica materials such as the silica compounds of the M41S series, including MCM-41 (hexagonal), MCM-48 (cubic), and other mesoporous materials such as SBA-1, SBA-2, SBA-3, and SBA-15, as well as the KIT series of mesoporous materials such as KIT-1, KIT-5, and KIT-6. Macroporous silicas and other oxide supports such as the commercial macroporous silicas available as Davisil® products may be suitable, e.g., Davisil 634° (~6 nm pore size, ~480 m²/g pore volume), Davisil 635® (~6 nm, ~480 m²/g), and/or Davisil 644® (~15 nm, ~300 m²/g). According to the IUPAC definition, mesoporous materials are those having a pore size of about 2 nm to about 50 nm, and macroporous materials are those having a pore size of over ~50 nm. According to the IUPAC, a mesoporous material can be disordered or ordered in a mesostructure. Preferred mesoporous and macroporous support materials can be characterized by a BET surface area of at least 300 m²/g, e.g., at least 500 m²/g, prior to treatment with the base compound. The M41S materials and their synthesis are described in a number of Mobil patents, including U.S. Pat. Nos. 5,102,643, 5,057,296, 5,098,684, and 5,108,725, to which reference is made for a description of them, as well as in the literature in "*The Discovery of ExxonMobil's M*415 *Family of Mesoporous Molecular Sieves*", Kresge et al, Studies in Surface Science and Catalysis, 148, Ed. Terasaki, Elsevier bV 2004. SBA-15 is described in "*Triblock Copolymer Syntheses of Mesoporous Silica with Periodic* 50 *to* 300 *Angstrom Pores*", Dongyuan Zhao, et al. (1998), *Science* 279 (279). KIT-1 is described in U.S. Pat. No. 5,958,368, and other members of the KIT series are known (see, e.g., KIT-6 in *Nanoscale Res Lett.*, 2009 November, 4(11): 1303-1308).

As shown below, the $H_2S/CO_2$ selectivity of the material can be adjusted by the judicious choice of the porous support structure; coupled with the potential for controlling the $H_2S/CO_2$ selectivity by the use of different adsorbent molecules on the support, there is a significant potential for tailoring the selectivity of the adsorbent.

The basic nitrogenous compound may simply be physically sorbed on the support material (e.g., by impregnation or bonded with or grafted onto it by chemical reaction with the base itself or a precursor or derivative in which a substituent group provides the site for reaction with the support material in order to anchor the sorbent species onto the support).

Typically, however, bonding is not required for an effective solid phase sorbent material. Support materials containing reactive surface groups (such as the silanol groups found on zeolites and the M41S silica oxides) are typically capable of reacting with siloxane groups in compounds such as trimethoxysilylpropyl-dimethylamine. An alternative method of fixing more volatile adsorbing species on the support can be by first impregnating the species into the pores of the support and then cross-linking them in place through a reaction that does not involve the basic nitrogenous groups responsible for the sorption reaction in order to render the sorbing species non-volatile under the selected sorption conditions. Grafting or bonding methods are known in the technical literature. The molecular dimensions of the base sorbent can advantageously be selected in accordance with the pore dimensions of the support material, since bulky bases/precursors/derivatives may not be capable of entering pores of limited dimensions. A suitable match of base and support may be determined if necessary by empirical means.

Solid phase sorbents will normally be operated in fixed beds contained in a suitable vessel and operated in the conventional cyclic manner with two or more beds in a unit with each bed switched between sorption and desorption and, optionally, purging prior to re-entry into the sorption portion of the cycle, as described above briefly with reference to FIG. 1. Purging may be carried out with a stream of the purified gas mixture, i.e., a stream of the gas from which the $H_2S$ has been removed in the sorption process. If operated in temperature swing mode, a cooling step will intervene at some point between the desorption step and the next absorption step. Alternatively, moving bed or fluidized bed systems any be used; rotating wheel beds are notably useful in rapid cycle sorption systems. All these systems may be operated in their conventional manner when using the present sorbents.

Liquid Phase Sorbents

If the sorption process is operated with the sorbent in liquid form, either neat or in a non-aqueous solution, the liquid can typically be circulated in a closed loop between a sorption zone (e.g., in one vessel) and a desorption or regeneration zone (e.g., in a separate vessel) in a manner conventional to cyclic amine scrubbing processes. The process may be operated on a pressure swing and/or temperature swing basis. With pressure swing, the partial pressure of $H_2S$ during the sorption step can typically be higher than its partial pressure in the desorption step, with the sorption pressure typically being selected according to the source of the gas stream. With natural gas streams that may emerge from producing formations at pressures up to, say, ~50 MPag, the pressure will normally be reduced, if necessary, to suit processing equipment and the specification pipelining pressure, typically to values in the range of about 1 MPag to about 10 MPag, depending on the pipeline specifications. Pressure in the desorption step can be selected to achieve adequate desorption of the $H_2S$, with typical natural gas pressures as low as ~1-2 bar for desorption, e.g., when the $H_2S$ is taken to a Claus Plant, although higher desorption pressures can sometimes be preferred, e.g., to reduce/minimize compression costs such as when $H_2S$ is to be re-injected into the producing formation.

Many of the basic nitrogenous compounds useful as sorbents in the present process can typically be liquids and may generally be used neat as the sorbent material in a liquid phase operation. If necessary or desirable, for example, to preclude the formation of precipitates, the sorbing species may be taken up in a solvent. Water is, of course, excluded as a solvent in order to maintain the required non-aqueous conditions and to preserve the selectivity for sorbing the $H_2S$. Preferred solvents can generally include those which are themselves non-protogenic, so as to de-emphasize/preclude formation of bicarbonate species and the chemisorption of $CO_2$ or other species in the gas stream (such as $SO_2$) and which are not corrosive towards the equipment of the processing unit. Solvents such as toluene, DMSO (dimethyl sulfoxide), sulfolane (tetramethylene sulfone), DMF (N,N-dimethylformamide), NMP (N-methyl-2-pyrrolidone), acetonitrile, HMPA (hexamethylphosphoramide), THF (tetrahydrofuran), ketones such as methyl ethyl ketone (MEK), esters such as ethyl acetate and amyl acetate, halocarbons such as 1,2-dichlorobenzene (ODCB), and the like, and combinations thereof may be found suitable. Preferably, the solvent can have a boiling point of at least 65° C., e.g., at least 70° C., in order to reduce solvent losses in the process. Additionally or alternately, solvents with higher relative boiling points may be desirable in a temperature swing operation, e.g., if the desorption/regeneration is to be carried out at relatively higher temperatures (for instance, with a TSA temperature of at least 100° C., the solvent(s) should typically have a boiling point of at least 100° C., e.g., greater than 110° C.). Use of higher boiling point solvents can conserve valuable energy which would otherwise be consumed in solvent vaporization.

Boiling points for selected solvents herein are tabulated below.

| | Boiling Point, ° C. |
|---|---|
| Toluene | ~110.6 |
| Sulfolane | ~285 |
| DMSO | ~189 |
| DMF | ~153 |
| MEK | ~80 |
| Acetonitrile | ~81 |
| THF | ~66 |
| ODCB | ~180.5 |

Once the absorbent solution has been formulated, optionally with ingredients such as antioxidants, corrosion inhibitors, and the like, it can be employed in the process.

When operating with a liquid phase sorbent, the process can be carried out in a two-vessel unit with the liquid sorption medium circulating in a closed loop between a sorption column and a desorption (regeneration) column in a fluidly connected circuit. The sorption column can advantageously be operated in a counter-current flow mode with an stream of the incoming gas passing through an opposite-flowing current of the liquid sorption medium entering at the opposing end of the column. The medium containing the sorbed contaminant can then be passed to the desorption/regeneration column under conditions selected to favor desorption of the sorbed contaminant, e.g., by reduction of pressure and/or increase of temperature. A stripping medium such as a non-reactive gas (e.g., $N_2$ and/or a light hydrocarbon) may be injected to facilitate desorption. Preferably in these embodiments, the sorption medium can passed in one direction in the desorption column and the desorbed contaminants taken out from one end of the column. The regenerated sorption medium can then be taken out from that one end of the column and recirculated to the proper end of the sorption column for a repeated sorption phase with the incoming gas.

Process Operation

Apparent selectivity for $H_2S$ sorption can typically be diminished to a certain extent in systems containing both $CO_2$ and $H_2S$ contaminants, not only by the relative adsorption characteristics of the selected adsorbent material but also by the physical sorption of $CO_2$ in both liquid and solid systems which becomes more perceivable at higher pressures; generally, the lower the partial pressures of both $H_2S$ and $CO_2$, the greater the tendency can be toward selectivity for $H_2S$. With the guanidine base sorbent 1,5,7-triazabicyclo[4.4.0]dec-5-ene, for example, the apparent selectivity towards $H_2S$ is approximately 2.2 at around 1 atm and about 5 at around 0.2 bar. The apparent selectivity is a combination of the selectivity for competitive adsorption on the support and the extremely selective (at least 1,000) adsorption at the functionalized sites that are $H_2S$-selective. Examples of an $H_2S$-selective functional site can include tertiary amines and other non-protogenic Lewis acid bases. In a preferred embodiment, the functionalized site $H_2S$ selectivity can be greater than 1,000, for example greater than 10,000 or even greater than 100,000. This extremely large site-specific selectivity can impart one or more unique characteristics to the adsorbent, one of which can include capability for removing trace levels of $H_2S$ in streams with relatively high $CO_2$ concentrations (which, without being bound by theory, is believed to be due to a substantial lack of competition for the $H_2S$-selective sites. In some embodiments, the $H_2S$-selective functionalized adsorbent can be used in a swing adsorption process to produce a product with no more than 4 vppm $H_2S$ from a natural gas feed containing at least 5 mol % $CO_2$ (e.g., from 5 mol % up to 50 mol %, from 5 mol % to 40 mol %, from 5 mol % to 30 mol %, from 5 mol % to 25 mol %, from 5 mol % to 20 mol %, from 5 mol % to 15 mol %, from 5 mol % to 10 mol %, from 10 mol % up to 50 mol %, from 10 mol % to 40 mol %, from 10 mol % to 30 mol %, from 10 mol % to 25 mol %, from 10 mol % to 20 mol %, from 10 mol % to 15 mol %, from 15 mol % up to 50 mol %, from 15 mol % to 40 mol %, from 15 mol % to 30 mol %, from 15 mol % to 25 mol %, from 15 mol % to 20 mol %, from 20 mol % up to 50 mol %, from 20 mol % to 40 mol %, from 20 mol % to 30 mol %, from 20 mol % to 25 mol %, from 25 mol % up to 50 mol %, from 25 mol % to 40 mol %, or from 25 mol % to 30 mol %) and from 6 vppm to 10,000 vppm $H_2S$ (e.g., from 8 vppm to 10,000 vppm, from 10 vppm to 10,000 vppm, from 15 vppm to 10,000 vppm, from 20 vppm to 10,000 vppm, from 30 vppm to 10,000 vppm, from 50 vppm to 10,000 vppm, from 100 vppm to 10,000 vppm, from 6 vppm to 5000 vppm, from 8 vppm to 5000 vppm, from 10 vppm to 5000 vppm, from 15 vppm to 5000 vppm, from 20 vppm to 5000 vppm, from 30 vppm to 5000 vppm, from 50 vppm to 5000 vppm, from 100 vppm to 5000 vppm, from 6 vppm to 2000 vppm, from 8 vppm to 2000 vppm, from 10 vppm to 2000 vppm, from 15 vppm to 2000 vppm, from 20 vppm to 2000 vppm, from 30 vppm to 2000 vppm, from 50 vppm to 2000 vppm, from 100 vppm to 2000 vppm, from 6 vppm to 1000 vppm, from 8 vppm to 1000 vppm, from 10 vppm to 1000 vppm, from 15 vppm to 1000 vppm, from 20 vppm to 1000 vppm, from 30 vppm to 1000 vppm, from 50 vppm to 1000 vppm, or from 100 vppm to 1000 vppm). Additionally or alternately, the $H_2S$-selective functionalized adsorbent can be used in a swing adsorption process to produce a product with no more than 4 vppm $H_2S$ from a natural gas feed containing between 6 vppm and 10,000 vppm $H_2S$ (e.g., from 8 vppm to 10,000 vppm, from 10 vppm to 10,000 vppm, from 15 vppm to 10,000 vppm, from 20 vppm to 10,000 vppm, from 30 vppm to 10,000 vppm, from 50 vppm to 10,000 vppm, from 100 vppm to 10,000 vppm, from 6 vppm to 5000 vppm, from 8 vppm to 5000 vppm, from 10 vppm to 5000 vppm, from 15 vppm to 5000 vppm, from 20 vppm to 5000 vppm, from 30 vppm to 5000 vppm, from 50 vppm to 5000 vppm, from 100 vppm to 5000 vppm, from 6 vppm to 2000 vppm, from 8 vppm to 2000 vppm, from 10 vppm to 2000 vppm, from 15 vppm to 2000 vppm, from 20 vppm to 2000 vppm, from 30 vppm to 2000 vppm, from 50 vppm to 2000 vppm, from 100 vppm to 2000 vppm, from 6 vppm to 1000 vppm, from 8 vppm to 1000 vppm, from 10 vppm to 1000 vppm, from 15 vppm to 1000 vppm, from 20 vppm to 1000 vppm, from 30 vppm to 1000 vppm, from 50 vppm to 1000 vppm, or from 100 vppm to 1000 vppm), while losing less than 5 mol % of the methane in the natural gas feed (e.g., typically less methane than $H_2S$, but in any event from 4 ppm to 4.5 mol % $CO_2$, from 4 ppm to 4 mol %, from 4 ppm to 3.5 mol %, from 4 ppm to 3 mol %, from 4 ppm to 2.5 mol %, from 4 ppm to 2 mol %, from 4 ppm to 1.5 mol %, from 4 ppm to 1 mol %, from 4 ppm to 0.5 mol %, from 4 ppm to 1000 ppm, from 4 ppm to 500 ppm, from 4 ppm to 300 ppm, from 4 ppm to 200 ppm, from 4 ppm to 100 ppm, from 10 ppm to 4.5 mol %, from 10 ppm to 4 mol %, from 10 ppm to 3.5 mol %, from 10 ppm to 3 mol %, from 10 ppm to 2.5 mol %, from 10 ppm to 2 mol %, from 10 ppm to 1.5 mol %, from 10 ppm to 1 mol %, from 10 ppm to 0.5 mol %, from 10 ppm to 1000 ppm, from 10 ppm to 500 ppm, from 10 ppm to 300 ppm, from 10 ppm to 200 ppm, from 10 ppm to 100 ppm, from 50 ppm to 4.5 mol % $CO_2$, from 50 ppm to 4 mol %, from 50 ppm to 3.5 mol %, from 50 ppm to 3 mol %, from 50 ppm to 2.5 mol %, from 50 ppm to 2 mol %, from 50 ppm to 1.5 mol %, from 50 ppm to 1 mol %, from 50 ppm to 0.5 mol %, from 50 ppm to 1000 ppm, from 50 ppm to 500 ppm, from 50 ppm to 300 ppm, from 50 ppm to 200 ppm, or from 50 ppm to 100 ppm) to the $H_2S$-rich reject (contaminant) stream.

To achieve relatively high $H_2S$ selectivity over $CO_2$, desorption may be carried out in a two step sequence in which the desorption conditions in the first step favor release of the $CO_2$ physisorbed on the support and those in the second step favor release of the $H_2S$ chemisorbed at the functionalized sites. In a pressure swing operation, this would mean that a reduction of overall pressure such that the $CO_2$ partial pressure (in a separate vessel for a liquid process) is dropped low enough that its physisorption is disfavored, thus releasing a $CO_2$ rich stream, followed by the second step where a further pressure swing is used to release an $H_2S$ rich stream. In this manner the physisorption of $CO_2$, which can potentially lower $H_2S$ selectivity, may be circumvented allowing highly selective removal of $H_2S$ in the presence of $CO_2$ under relatively higher pressure conditions.

The process may be operated according to conventional operating procedures appropriate to the process variant in use. It may be operated as a conventional PSA (cPSA) or TSA process, purge desorption (purge with inert gas such as nitrogen, which is not adsorbed), displacement purge (displacement with a competitively adsorbed species), or as a combination of these process variants. It may be operated as one of the rapid cycle variants (cycle time for a complete sorption/desorption cycle less than about two minutes, e.g., less than about one minute), including partial pressure swing or displacement purge adsorption (PPSA), rapid cycle pressure swing adsorption (RCPSA), Dual Bed (or Duplex) PSA Process, rapid cycle partial pressure swing, displacement purge adsorption (RCPPSA) technologies, or rapid cycle thermal swing adsorption (RCTSA) with rapid cycle variants using a solid phase sorbent system. Selection of conditions can frequently be dictated by the conditions (e.g., pressure and flow rate of the entering gas stream, proportion and type of contaminants, and desired pressure for the effluent product stream), with the most appropriate conditions selected on an empirical basis.

Adsorptive kinetic separation processes, apparatuses, and systems, as described above, are useful for development and production of hydrocarbons, such as gas and oil processing. Particularly, the provided processes, apparatuses, and systems can be useful for the rapid, large scale, efficient separation of a variety of target gases from gas mixtures.

The provided processes, apparatuses, and systems may be used to prepare natural gas products by removing contaminants. The provided processes, apparatuses, and systems can be useful for preparing gaseous feed streams for use in utilities, including separation applications such as dew point control, sweetening/detoxification, corrosion protection/control, dehydration, heating value, conditioning, and purification. Examples of utilities that utilize one or more separation applications can include generation of fuel gas, seal gas, non-potable water, blanket gas, instrument and control gas, refrigerant, inert gas, and hydrocarbon recovery. Exemplary "not to exceed" product (or "target") acid gas removal specifications can include: (a) 2 vol % $CO_2$, 4 ppm $H_2S$; (b) 50 ppm $CO_2$, 4 ppm $H_2S$; or (c) 1.5 vol % $CO_2$, 2ppm $H_2S$.

The provided processes, apparatuses, and systems may be used to remove acid gas from hydrocarbon streams. Acid gas removal technology becomes increasingly important as remaining gas reserves exhibit higher concentrations of acid (sour) gas resources. Hydrocarbon feed streams can vary widely in amount of acid gas, such as from several parts per million to 90 vol %. Non-limiting examples of acid gas concentrations from exemplary gas reserves can include concentrations of at least: (a) 1 vol % $H_2S$, 5 vol % $CO_2$; (b) 1 vol % $H_2S$, 15 vol % $CO_2$; (c) 1 vol % $H_2S$, 60 vol % $CO_2$; (d) 15 vol % $H_2S$, 15 vol % $CO_2$; or (e) 15 vol % $H_2S$, 30 vol % $CO_2$.

One or more of the following may be utilized with the processes, apparatuses, and systems provided herein, to prepare a desirable product stream, while maintaining relatively high hydrocarbon recovery:

(a) using one or more kinetic swing adsorption processes, such as pressure swing adsorption (PSA), thermal swing adsorption (TSA), and partial pressure swing or displacement purge adsorption (PPSA), including combinations of these processes; each swing adsorption process may be utilized with rapid cycles, such as using one or more rapid cycle pressure swing adsorption (RC-PDS) units, with one or more rapid cycle temperature swing adsorption (RC-TSA) units or with one or more rapid cycle partial pressure swing adsorption (RC-PPSA) units; exemplary kinetic swing adsorption processes are described in U.S. Patent Application Publication Nos. 2008/0282892, 2008/0282887, 2008/0282886, 2008/0282885, and 2008/0282884, which are each herein incorporated by reference in its entirety;

(b) removing acid gas with RC-TSA using advanced cycles and purges as described in U.S. Provisional Application No. 61/447,858, filed Mar. 1, 2011, as well as the U.S. patent application Ser. No. 13/406,079, claiming priority thereto, which are together incorporated by reference herein in their entirety;

(c) using a mesopore filler to reduce the amount of trapped methane in the adsorbent and increase the overall hydrocarbon recovery, as described in U.S. Patent Application Publication Nos. 2008/0282892, 2008/0282885, and 2008/028286, each of which is herein incorporated by reference in its entirety;

(d) choosing an appropriate adsorbent materials to provide high selectivity and reduce/minimize adsorption (and losses) of methane and other hydrocarbons, such as one or more of the zeolites described in U.S. Patent Application Publication Nos. 2008/0282887 and 2009/0211441, each of which is herein incorporated by reference in its entirety;

(e) depressurizing one or more RC-PSA units in multiple steps to intermediate pressures so that the acid gas exhaust can be captured at a higher average pressure, thereby decreasing the compression required for acid gas injection; pressure levels for the intermediate depressurization steps may be matched to the interstage pressures of the acid gas compressor to optimize the overall compression system;

(f) using exhaust or recycle streams to minimize processing and hydrocarbon losses, such as using exhaust streams from one or more RC-PSA units as fuel gas instead of re-injecting or venting;

(g) using multiple adsorbent materials in a single bed to remove trace amounts of first contaminants, such as $H_2S$, before removal of a second contaminant, such as $CO_2$; such segmented beds may provide rigorous acid gas removal down to ppm levels with RC-PSA units with minimal purge flow rates;

(h) using feed compression before one or more RC-PSA units to achieve a desired product purity;

(j) contemporaneous removal of non-acid gas contaminants such as mercaptans, COS, and BTEX; selection processes and materials to accomplish the same;

(k) using structured adsorbents for gas-solid contactors to minimize pressure drop compared to conventional packed beds;

(l) selecting a cycle time and cycle steps based on adsorbent material kinetics; and (m) using a process and apparatus that uses, among other equipment, two RC-PSA units in series, wherein the first RC-PSA unit cleans a feed stream down to a desired product purity and the second RC-PSA unit cleans the exhaust from the first unit to capture methane and maintain high hydrocarbon recovery; use of this series design may reduce the need for a mesopore filler.

The processes, apparatuses, and systems provided herein can be useful in large gas treating facilities, such as facilities that process more than five million standard cubic feet per day (MSCFD) of natural gas, for example more than 15 MSCFD, more than 25 MSCFD, more than 50 MSCFD, more than 100 MSCFD, more than 500 MSCFD, more than one billion standard cubic feet per day (BSCFD), or more than two BSCFD.

Compared to conventional technology, the provided processes, apparatuses, and systems can require lower capital investment, lower operating cost, and/or less physical space, thereby enabling implementation offshore and in remote locations, such as arctic environments. The provided processes, apparatuses, and systems can provide the foregoing benefits, while providing high hydrocarbon recovery as compared to conventional technology.

Additionally or alternately, the invention can comprise one or more of the following embodiments.

Embodiment 1

A cyclic process for selectively separating $H_2S$ from a feed gas mixture comprising $CO_2$ and $H_2S$, which process comprises: a) contacting the feed gas mixture under sorption conditions with a non-aqueous sorbent comprising a basic non-protogenic nitrogenous compound which reacts with at least a portion of the $H_2S$ in the feed gas mixture; b) sorbing the $H_2S$ into/onto the sorbent; c) subjecting the sorbent to desorption conditions by which at least a portion of the sorbed $H_2S$ is desorbed; and d) retrieving an $H_2S$-rich product stream that has a higher mol % of $H_2S$ than the feed gas mixture.

Embodiment 2

A process according to embodiment 1 in which the basic nitrogenous compound comprises a tertiary amine (e.g., triethylamine, triethanolamine, and/or methyldiethanolamine), an amidine, a guanidine, a biguanidine, or a combination thereof

Embodiment 3

A process according to embodiment 1 or embodiment 2 in which the basic nitrogenous compound is supported on a porous solid (e.g., a mesoporous and/or macroporous solid oxide such as silica, including MCM-41, MCM-48, SBA-1, SBA-2, SBA-3, SBA-15, KIT-1, KIT-5, KIT-6, and combinations thereof).

Embodiment 4

A process according to embodiment 3 in which the basic nitrogenous compound is grafted onto the porous solid by chemical reaction.

Embodiment 5

A process according to any one of the previous embodiments, wherein the sorption and desorption steps are conducted at different temperatures and/or wherein the sorption and desorption steps are conducted at different pressures, such that one or more of (a) the total pressure of the desorption step is lower than the total pressure of the sorption step, (b) the partial pressure of $H_2S$ in the desorption step is less than the partial pressure of $H_2S$ in the sorption step, and (c) the pressure in the sorption step is such as to cause $CO_2$ to be sorbed from the gas stream in addition to the $H_2S$.

Embodiment 6

A process according to any of the previous embodiments in which at least a portion of the sorbed $H_2S$ is desorbed by a non-sorbing inert purge gas and/or by a displacement purge gas.

Embodiment 7

A process according to any one of the previous embodiments in which desorption is carried out in at least two steps under conditions of different pressure in each step with the pressure of the first desorption step being higher than the pressure of the second desorption step so that most of the $CO_2$ sorbed in the sorption step is desorbed in the first desorption step and most of the $H_2S$ absorbed in the sorption step is desorbed in the second desorption step.

Embodiment 8

A process according to any one of the previous embodiments in which the process is operated cyclically between the sorption and desorption conditions with a total cycle time of less than one minute.

Embodiment 9

A process to any one of the previous embodiments in which the $CO_2$ and $H_2S$ partial pressures during the sorption step are less than about 1 bar.

Embodiment 10

A process to any one of the previous embodiments in which the feed gas mixture contains less than 5 mol % water.

Embodiment 11

A process according to any one of the previous embodiments further comprising a step of retrieving a feed gas product stream that has a lower content of $H_2S$ than in the feed gas mixture, wherein (a) the feed gas mixture contains from about 10 vppm to about 10,000 vppm $H_2S$ and the feed gas product stream contains less than about 4 vppm $H_2S$ and/or (b) the feed gas mixture contains at least 5 mol % $CO_2$ and the feed gas product stream contains at most 5 mol % less $CO_2$ than the feed gas mixture.

Embodiment 12

A cyclic process for selectively separating $H_2S$ from a natural gas feed stream comprising $H_2S$ and $CO_2$, which process comprises: (i) contacting the natural gas feed stream under $H_2S$ sorption conditions with a non-aqueous sorbent comprising a basic non-protogenic nitrogenous compound; (ii) reacting at least a portion of the $H_2S$ in the natural gas feed stream with the sorbent so that the $H_2S$ is absorbed by the sorbent; (iii) retrieving a natural gas product stream; (iv) subjecting the sorbent containing the sorbed $H_2S$ to desorption conditions by which at least a portion of the $H_2S$ in the sorbent is desorbed from the sorbent; (v) retrieving an $H_2S$ rich product stream that has a higher mol % of $H_2S$ than the natural gas feed stream; (vi) passing at least a portion of the $H_2S$-rich product stream to a Claus plant; and (vii) recovering sulfur from the $H_2S$ in the side stream, wherein the natural gas product stream has a lower content of $H_2S$ in mol % than the natural gas feed stream, and wherein optionally a greater mol % of $H_2S$ is sorbed by the basic compound than $CO_2$ sorbed by the sorbent.

Embodiment 13

A process according to embodiment 12 wherein (a) the natural gas feed stream contains from about 10 vppm to about 10,000 vppm $H_2S$ and the natural gas product stream contains less than about 4 vppm $H_2S$ and/or (b) the natural gas feed stream contains at least 5 mol % $CO_2$ and the natural gas product stream contains at most 5 mol % less $CO_2$ than the natural gas feed stream.

Embodiment 14

A process according to embodiment 12 or embodiment 13 wherein the sorption and desorption steps are conducted at different temperatures and/or wherein the sorption and desorption steps are conducted at different pressures, such that one or more of (a) the total pressure of the desorption step is lower than the total pressure of the sorption step, (b) the partial pressure of $H_2S$ in the desorption step is less than the partial pressure of $H_2S$ in the sorption step, and (c) the pressure in the sorption step is such as to cause $CO_2$ to be sorbed from the gas stream in addition to the $H_2S$.

Embodiment 15

A cyclic process for separating $H_2S$ and $CO_2$ from a natural gas feed stream comprising $H_2S$ and $CO_2$, from a producing formation, which process comprises: (i) contacting the natural gas feed stream under $H_2S$ sorption conditions with a non-aqueous sorbent comprising a basic non-protogenic nitrogenous compound; (ii) reacting at least a portion of the $H_2S$ and $CO_2$ in the natural gas feed stream with the sorbent so that the $H_2S$ and the $CO_2$ are absorbed by the sorbent; (iii) retrieving a natural gas product stream; (iv) subjecting the sorbent containing the sorbed $H_2S$ and $CO_2$ to first desorption conditions by which a higher mol % of $CO_2$ is desorbed than $H_2S$; (v) retrieving a $CO_2$ rich product stream that has a higher mol % of $CO_2$ than the natural gas feed stream; (vi) subjecting the sorbent containing the sorbed $H_2S$ and $CO_2$ to second desorption conditions by which a higher mol % of $H_2S$ is desorbed than $CO_2$; (vii) retrieving an $H_2S$-rich product stream that has a higher mol % of $H_2S$ than the natural gas feed stream; and (viii) re-injecting the side stream comprising $CO_2$ into the producing formation, wherein the natural gas product stream has a lower mol % of each $H_2S$ and $CO_2$ than the natural gas feed stream.

Embodiment 16

A process according to embodiment 15 further comprising: sending at least a portion of the $H_2S$-rich stream to a Claus plant; and recovering sulfur from the $H_2S$-rich stream.

Embodiment 17

A cyclic process for separating $H_2S$ and $CO_2$ from a feed gas stream comprising $H_2S$ and $CO_2$, to produce a first product gas stream comprising $H_2S$ and a second product gas stream comprising $CO_2$ depleted in $H_2S$, which process comprises: (i) contacting the feed gas stream under $H_2S$ sorption conditions with a non-aqueous sorbent comprising a basic non-protogenic nitrogenous compound; (ii) reacting at least a portion of the $H_2S$ and the $CO_2$ in the feed gas stream with the sorbent so that the $H_2S$ and $CO_2$ are absorbed by the sorbent; (iii) subjecting the sorbent containing the absorbed $H_2S$ and $CO_2$ to $CO_2$ desorption conditions by which a higher mol % of the $CO_2$ is desorbed than $H_2S$; (iv) retrieving a $CO_2$ rich product stream that has a higher mol % of $CO_2$ than the feed gas stream; (v) subjecting the sorbent containing the absorbed $H_2S$ and $CO_2$ to $H_2S$ desorption conditions by which a higher mol % of $H_2S$ is desorbed than $CO_2$; and (vi) retrieving an $H_2S$ rich product stream that has a higher mol % of $H_2S$ than the feed gas stream.

Embodiment 18

A process according to embodiment 17 in which the $CO_2$ rich product stream has a lower mol % of $H_2S$ than the feed gas stream and/or in which at least a portion of the $H_2S$-rich product stream is passed to a Claus plant for the recovery of sulfur.

Embodiment 19

A process according to embodiment 18 in which the feed gas stream comprises at least a combined total of 50 mol % $H_2S$ and $CO_2$, wherein the feed gas stream is a pre-separated contaminant stream resulting from the separation of $H_2S$ and $CO_2$ from a natural gas stream from a producing formation and the $CO_2$-rich stream is re-injected into the producing formation.

EXAMPLES

Example 1

Synthesis of Amine-Grafted Mesoporous Silicas

Mesoporous silica supports were prepared according to methods known in the literature or were purchased from commercial sources. Aminosilanes were either purchased from commercial sources or, in the case of the TBD and THP silanes (below), synthesized by the reaction of the cyclic amine with 1-trimethoxysilyl-3-iodopropane.

Amines were grafted to the mesoporous silica supports by heating an excess of the appropriated amine-silane with the support in toluene at elevated temperature. A typical preparation using MCM-48 is given below.

Synthesis of Dimethylaminopropyl-Functionalized MCM-48

MCM-48 was dried at ~200° C. in air overnight (~10-16 hours). About 20 g dry MCM-48 was dispersed in ~120 mL toluene and stirred to disperse the solid. About 20 g of (N,N-dimethylaminopropyl)trimethoxysilane (CAS 2530-86-1) was added and the mixture stirred at ~85° C. for about 18 hours. The solid was isolated by filtration, washed with toluene, and dried at ~80° C. for about 4 hours.

The amine reagents used were:

| | Reagent | CAS # |
|---|---|---|
| DMA | (N,N-Dimethylaminopropyl)trimethoxysilane | 2530-86-1 |
| TBD | 1-(3-trimethoxysilylpropyl-[1,5,7-triazabicyclo[4.4.0]dec-5-ene] | |
| THP | 1-(3-trimethoxysilylpropyl-[1,4,5,6-tetrahydropyrimidine] | |

The amine-grafted silicas were characterized by X-ray diffraction. In all cases the structure of the support was maintained after grafting. Nitrogen isotherms were measured at ~77° K after outgassing at ~100° C. to determine BET surface areas and pore volumes. Samples were analyzed for carbon, nitrogen, and ash to determine loading of organic. The loading is quoted in mmol amine/g $SiO_2$, determined from the % N and % $SiO_2$ results. $CO_2$ capacities were measured at ~0.1 bar $CO_2$ after outgassing at ~120° C. in either a gravimetric or volumetric apparatus.

The properties of the amine-modified silicas were:

| Amine Amount (g) | Support Description | % C | % N | mmol/g $SiO_2$ | SA ($m^2/g$) | PV (cc/g) | $CO_2$ @ 0.1 bar (mmol/g) |
|---|---|---|---|---|---|---|---|
| 27 | DMA - MCM-48 | 12.2 | 2.46 | 2.21 | 747 | 0.603 | |
| 12.36 | DMA - SBA-15 | 8.19 | 1.75 | 1.51 | 428 | 0.569 | 0.059 |
| 6.1 | DMA - KIT-6 | 8.23 | 1.89 | 1.62 | 363 | 0.548 | 0.048 |
| 2 | TBD - MCM-48 | 19.3 | 6.75 | 2.99 | 11 | 0.031 | |
| 1.01 | TBD - Davisil 634 ® | 10.9 | 3.56 | 1.12 | 154 | 0.556 | |
| 1.89 | TBD - MCM-48 | 19.4 | 6.67 | 2.91 | 17 | 0.035 | |
| 1.5 | THP - MCM-48 | 16.5 | 5.66 | 3.15 | 356 | 0.241 | |

The DMA-functionalized MCM-48 adsorbed very little $CO_2$ at ambient temperature, comparable to the physisorption for $CO_2$ shown by ungrafted MCM-48 as the amino group in this material is tertiary and non-protogenic. Without being bound by theory, the low surface area and pore volume of the TBD-functionalized MCM-48 may be attributed to pore blocking by the bulky reactant, implying that the relative dimensions of the modifier could be adjusted in accordance with the pore dimensions of the support material. The retention of pore volume with Davisil 634® (surface area ~480 $m^2/g$) demonstrated that even relatively bulky modifiers may be used with appropriately dimensioned support materials.

Example 2

CO2 Adsorption with Protogenic Amines

For comparison, mesoporous supports were modified in the same way as described in Example 1 with two protogenic amines: trimethoxy[3-(methylamino)propyl]silane (MA-CAS 3069-25-8) and 3-(trimethoxysilyl)propylamine (APTS, CAS 13822-56-5). The properties of the modified silicas were then determined as described in Example 1 with the following results:

| Amine Amount (g) | Support Description | % C | % N | mmol/g $SiO_2$ | SA ($m^2/g$) | PV (cc/g) | $CO_2$ @ ~0.1 bar (mmol/g) |
|---|---|---|---|---|---|---|---|
| 6.12 | MA - KIT-6 | 9.73 | 2.43 | 2.11 | 309 | 0.456 | — |
| 6.53 | MA - SBA-15 | 9.14 | 2.48 | 2.19 | 490 | 0.676 | 0.390 |
| 13.2 | MA - MCM-48 | 10.7 | 2.85 | 2.63 | 668 | 0.584 | 0.373 |
| 6.52 | APTS - MCM-48 | 9.27 | 2.67 | 2.35 | 407 | 0.611 | 0.470 |

Comparison of the $CO_2$ adsorption values immediately above shows that the use of non-protogenic amine modification as in Example 1 resulted in significantly decreased affinity for $CO_2$, compared to the $CO_2$ adsorption with protic amines (nearly an order of magnitude lower than with the materials of Example 2).

Example 3

The following adsorption isotherms of $H_2S$ and $CO_2$ in the guanidine base 1,5,7-triazabicyclo[4.4.0]dec-5-ene(TBD) on an MCM-48 support prepared as described in Example 1, were determined:
1. $CO_2$ adsorption isotherm taken on the fresh sample (after vacuum desorption at ~120° C.).
2. $H_2S$ adsorption isotherm (also after vacuum desorption at ~120° C.).
3. A second $CO_2$ isotherm taken after the $H_2S$ measurements and also after vacuum desorption at ~120° C.
4. To confirm the results of the $CO_2$ adsorption isotherm on the fresh sample at relatively low pressures, the isotherm was determined on a fresh sample using an Autosorb analyzer at pressures up to ~1 bar.

Figure 2:
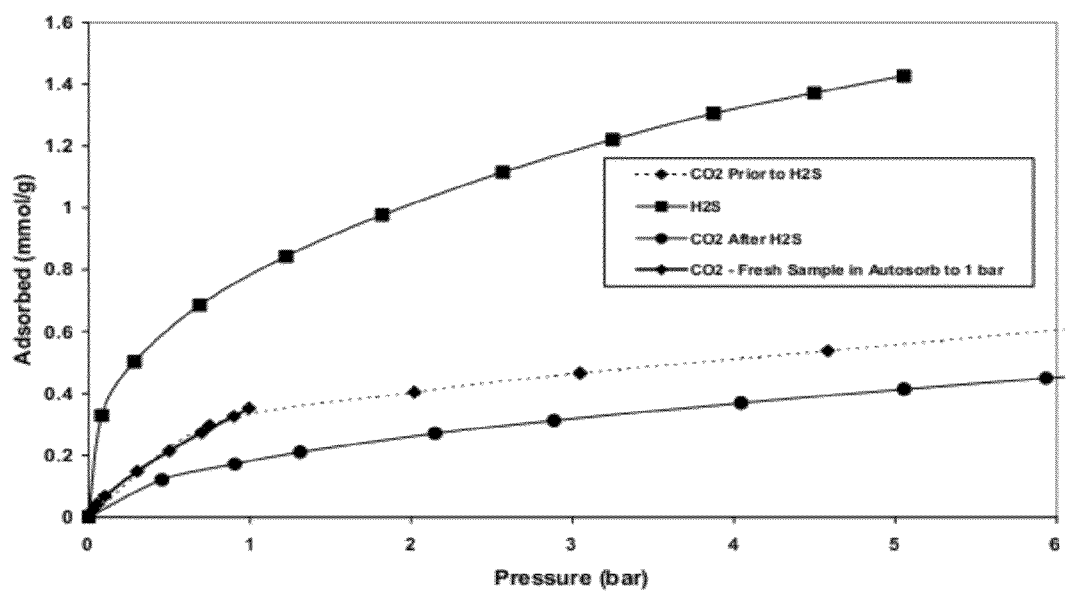
FIG. 2 shows the $H_2S$ and $CO_2$ adsorption isotherms for a guanidine base supported on MCM-48.

The isotherms are shown in FIG. 2 and demonstrated that, in the often important pressure region below ~1 barg (pressure in bar gauge), the apparent selectivity of $H_2S$ over $CO_2$ was significant and that, with increasing pressure, the selectivity increased slowly but progressively to pressures of ~5 barg. The apparent selectivity seen in FIG. 2 was believed to be due (without being bound by theory) to a combination of adsorption on the support and the extremely selective $H_2S$ adsorption at the functionalized sites. The lower $CO_2$ capacity observed in the isotherm for $CO_2$ after $H_2S$ adsorption may be due (again, without being bound by theory) to the ~120° C. desorption not completely removing the $H_2S$.

Example 4

Figure 3:
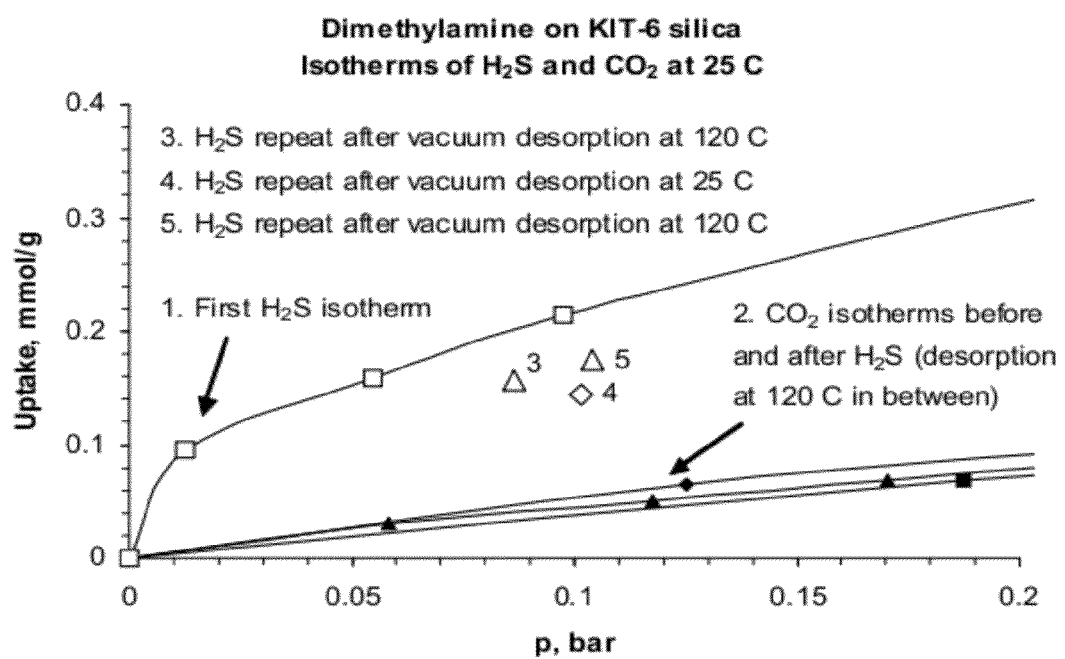
FIG. 3 shows the adsorption isotherms of $H_2S$ and $CO_2$ on KIT-6 functionalized with a tertiary amino group.

Dimethylaminopropyl-functionalized KIT-6 was prepared in the same manner as described in Example 1 using a KIT-6 silica support. The adsorption isotherms of $H_2S$ and $CO_2$ on the functionalized KIT-6 were determined and are shown in FIG. 3.
1. $H_2S$ adsorption isotherm taken on the fresh sample (after vacuum pretreatment at ~120° C.).
2. $CO_2$ adsorption isotherms taken before $H_2S$ measurements and also after $H_2S$ measurements which were followed by vacuum desorption at ~120° C.
3. $H_2S$ adsorption isotherm repeat after vacuum desorption of $H_2S$ at ~120° C.
4. $H_2S$ adsorption isotherm repeat after vacuum desorption $H_2S$ at ~25° C.
5. $H_2S$ adsorption isotherm repeat after vacuum desorption $H_2S$ at ~120° C.

The results show that the non-protogenic system was notably more selective for $H_2S$ adsorption than for $CO_2$. In addition to selectivity for $H_2S$ both at very low as well as higher pressures, this Example shows that approximately 65% of the original $H_2S$ capacity can be regained by using pressure swing desorption conditions only, without applying any temperature swing. No significant change in $CO_2$ adsorption was seen after the material sorbed $H_2S$ (note closeness of curves designated "No. 2" in FIG. 3). These features are highly beneficial for using these amines for $H_2S$ removal.

Example 5

The adsorption isotherms of $H_2S$ and $CO_2$ on DMA-functionalized SBA-15 were investigated further using the same methodology to determine the $H_2S$ adsorption isotherm on the fresh sample (after vacuum pretreatment at ~120° C.) and the $CO_2$ adsorption isotherms before and after $H_2S$ measurement.

Figure 4:
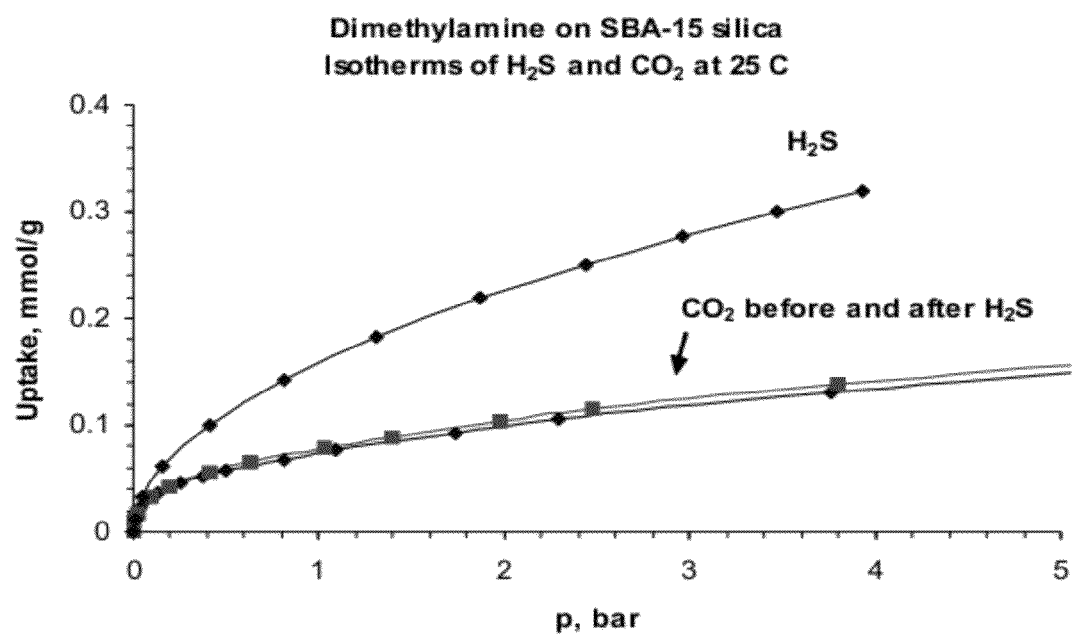
FIG. 4 shows the $H_2S$ and $CO_2$ adsorption isotherms for SBA-15 functionalized with a tertiary amino group.

The results in FIG. 4 show that, despite the fact that the same amine has been attached to the support surface, the material exhibited lower selectivity to $H_2S$ and lower $H_2S$ and $CO_2$ sorption capacities overall, as compared to KIT-6. The isotherms on this SBA-15 were qualitatively different from both the case of a non-functionalized open silica surface and the same amine grafted on KIT-6 support, with a potential disadvantage that the capacities were relatively lower. This result was unexpected, because the initial SBA-16 and KIT-6 supports had very similar pore structure parameters (surface area, pore volume, and pore size) and were given similar amine loadings (in moles of N per gram of the material). Without being bound by theory, it is possible that the differences with KIT-6 can be attributed to the fact that SBA-15 is not only mesoporous but also microporous: SBA-15 is a 1D mesoporous structure with microporous pore walls while KIT-6 has a highly accessible and highly connected three-dimensional structure (Ia3d), which can be beneficial for achieving uniform functionalization and for the resulting sorption properties. Different functional groups can, however, be attached to SBA-15 and other support materials in a different way, which may affect their adsorption properties, notably the $H_2S/CO_2$ selectivity.

Example 6

To demonstrate the ability of the adsorbent to remove trace levels of $H_2S$ from streams with high concentrations of $CO_2$, a breakthrough experiment was constructed. In this experiment, a stream with ƒ5 mol % $CO_2$, ~72 ppm $H_2S$, and the balance methane was flowed through an adsorbent bed containing an $H_2S$-selective DMA (dimethlyaminopropyl) material on KIT-6 adsorbent made according to procedures described in Example 2. For the breakthrough experiment, a ~⅛" tube was packed with ~0.2 grams of the functionalized adsorbent. To condition the adsorbent, the sample was initially pretreated at about 120° C. in a flowing helium stream. This pretreatment is not necessarily required but was conducted to simplify interpretation of the breakthrough experiments. Breakthrough experiments were conducted at ~40° C. by switching from a helium flow to a feed containing ~5 mol % $CO_2$, ~72 vppm $H_2S$, and the balance methane. The feed and helium were flowed through the bed at ~5 cm³/min, and the bed pressure was about 1 bara to about 2 bara (bar absolute). FIG. 5 shows the results of the initial breakthrough experiment, as well as a repeat that was conducted after regenerating with a purge and no 120° C. pretreatment. It can be seen that the relatively high concentration (~5 mol %) of $CO_2$ broke through the bed within about the first 120 seconds. When this rise occurred, the $CO_2$ adsorption front can be said to have passed substantially (entirely) through the bed. The $H_2S$ adsorption front did not break through the bed until about 600 seconds after the start of the experiment. When $H_2S$ broke through the bed, its concentration rose rapidly, showing that the $H_2S$ had a relatively sharp adsorption front in the bed, whereas, at times less than about 400 seconds, the $H_2S$ concentration in the effluent was undetectable by gas chromatography methods (less than ~1 vppm). This breakthrough experiment validates the concept of an adsorption process to remove $H_2S$ from a relatively high concentration of $CO_2$. The bed can be regenerated with either a purge or thermally. In this experiment, the bed was not heated during regeneration and was purged with pure methane with the bed remaining at about 40° C. The time evolution of CO$_2$ and H$_2$S coming from the bed is shown in FIG. 6. The agreement between the first and second adsorption/desorption cycles are shown in both FIGS. 5 and 6.

Example 7

To further demonstrate the ability of the adsorbent to remove trace levels of H$_2$S from streams with high concentrations of CO$_2$, a breakthrough experiment with a different H$_2$S-selective adsorbent was run. In this experiment, a mass spectrometer was used to assay the composition of the effluent from the bed (in Example 6, compositions were analyzed using gas chromatography). After switching from flowing He, a feed stream containing ~5 mol % CO$_2$ and about 262 vppm H$_2$S, a relatively small concentration (less than 100 vppm) of COS, and the balance methane, was flowed through an adsorbent bed containing an H$_2$S-selective adsorbent (in this case, DMA supported on an SBA-15 silica made according to procedures described in Example 2). For the breakthrough experiment, a ~⅛" tube was packed with ~0.25 grams of the functionalized adsorbent. To condition the adsorbent, the sample was initially pretreated at about 120° C. in a flowing helium stream. This pretreatment is not necessarily required but was conducted to simplify interpretation of the breakthrough experiments. Breakthrough experiments were conducted at ~40° C. by switching at about 2.5 minutes from the helium flow to the feed containing ~5 mol % CO$_2$, ~262 vppm H$_2$S, a relatively small concentration (less than 100 vppm) of COS, and the balance methane. The feed and helium were flowed through the bed at ~5 cm$^3$/min, and the bed pressure was about 1 bara to about 2 bara (bar absolute). FIG. 7 shows the results of the initial breakthrough experiment. It can be seen that, shortly after the feed begins flowing through the bed, the CO$_2$ in the effluent from the bed rose to ~100% of the initial CO$_2$ concentration in the feed (~5 mol %). When this rise occurred, the CO$_2$ adsorption front can be said to have passed substantially (entirely) through the bed. The H$_2$S adsorption front, however, did not break through the bed until about 16 minutes after the start of the experiment, at which point the H$_2$S concentration gradually rose to ~100% of the initial H$_2$S concentration in the feed (~262 vppm). At times less than ~16 minutes, the H$_2$S concentration in the effluent was observed by mass spectrometric methods to be less than about 1 vppm. The regeneration of the bed can be undertaken thermally and/or with a purge. Data showing CO$_2$ and H$_2$S effluent concentrations overlaid from four sequential methane purge regenerations at ~40° C. following repeated breakthrough experiments is shown in FIG. 8 (in which a value of ~100% corresponds to effluent concentrations of ~5 mol % for CO$_2$ and ~262 vppm for H$_2$S).

Example 8

Figure 9:
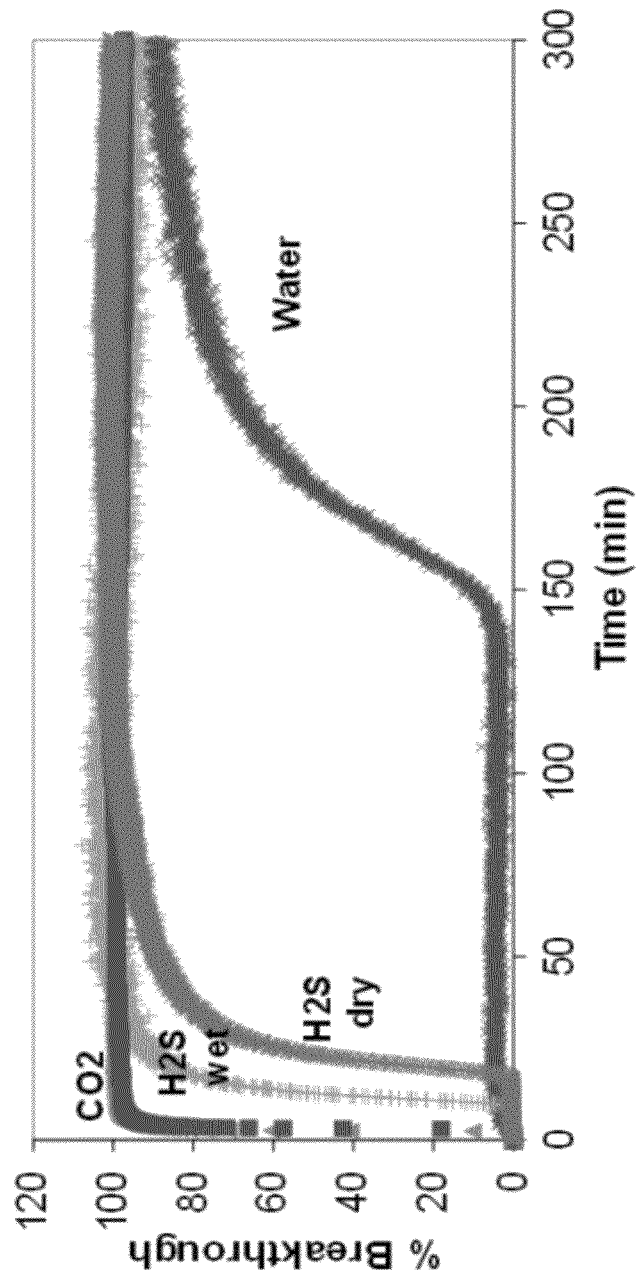
FIG. 9 shows the sorption cycle for the breakthrough experiment of Example 8, where $H_2S$ is sorbed in the presence of water, as compared to the sorption cycle from Example 7, which occurs in the absence of water.

To demonstrate that the H$_2$S-selective adsorbents can still function in a modest concentration of water, the adsorbent used in the breakthrough experiment of Example 7 was rerun with but about 420 vppm water vapor was added to the feed in place of some of the methane (i.e., ~5 mol % CO$_2$, ~262 vppm H$_2$S, less than 100 vppm COS, ~420 vppm water, and the balance methane; same sorbent; same analysis technique). For this breakthrough experiment, a ~⅛" tube was packed with ~0.16 grams of the functionalized adsorbent. To condition the adsorbent, the sample was initially pretreated at about 120° C. in a flowing helium stream. This pretreatment is not necessarily required but was conducted to simplify interpretation of the breakthrough experiments. Breakthrough experiments were conducted at ~40° C. by switching at about 2.5 minutes from the helium flow to the feed. The feed and helium were flowed through the bed at ~5.4 cm$^3$/min, and the bed pressure was about 1 bara to about 2 bara (bar absolute). FIG. 9 shows the results of the breakthrough experiment, overlaid with the results from Example 7. It can be seen in both sets of experimental data that, shortly after the feed begins flowing through the bed, the CO$_2$ in the effluent from the bed rose to ~100% of the initial CO$_2$ concentration in the feed (~5 mol %). When this rise occurred, the CO$_2$ adsorption front can be said to have passed substantially (entirely) through the bed. In the experiment with the water-containing feed, the H$_2$S adsorption front broke through the bed after about 9 minutes after the start of the experiment (as opposed to at about 16 minutes without water in Example 7), at which point the H$_2$S concentration gradually rose to ~100% of the initial H$_2$S concentration in the feed (~262 vppm). Without being bound by theory, it is noted that there was a slight difference in the amount of sorbent material and in the flow rate between Example 8 and Example 7, and thus it is possible that the difference in the breakthrough times for the two experiments may be at least partially due to those factors. Before breakthrough, the H$_2$S concentration in the effluent was observed by mass spectrometric methods to be less than about 1 vppm. FIG. 9 shows that water vapor broke through the bed at a later time at which point the H$_2$O concentration gradually rose to ~100% of the initial water concentration in the feed (~420 vppm). The regeneration of the bed can be undertaken thermally and/or with a purge.

What is claimed is:

1. A cyclic process for selectively separating H$_2$S from a feed gas mixture comprising CO$_2$ and H$_2$S, which process comprises:
    a) contacting the feed gas mixture under sorption conditions with a non-aqueous sorbent comprising a basic non-protogenic, tertiaryaminosiloxane compound grafted onto a mesoporous solid oxide having surface silanol groups selected from MCM-41, MCM-48, SBA-1, SBA-2, SBA-3, SBA-15, KIT-1, KIT-5, KIT-6, and combinations thereof, which sorbent reacts with at least a portion of the H$_2$S in the feed gas mixture;
    b) sorbing the H$_2$S and some of the CO$_2$ onto the adsorbent, wherein the nonaqueous adsorbent has a selectivity for H$_2$S over CO$_2$ under the adsorption conditions;
    c) subjecting the adsorbent to desorption conditions by which at least a portion of the sorbed H$_2$S is desorbed; and
    d) retrieving an H$_2$S-rich product stream that has a higher mol % of H$_2$S than the feed gas mixture.

2. A process according to claim 1 in which the sorption and desorption steps are conducted at different pressures wherein the total pressure of the desorption step is lower than the total pressure of the sorption step.

3. A process according to claim 1 in which the sorption and desorption steps are conducted at different pressures wherein the partial pressure of H$_2$S in the desorption step is less than the partial pressure of H$_2$S in the sorption step.

4. A process according to claim 1 in which the sorption and desorption steps are conducted at different temperatures.

5. A process according to claim 1 in which at least a portion of the sorbed H$_2$S is desorbed by a non-sorbing inert purge gas and/or by a displacement purge gas.

6. A process according to claim 2 in which desorption is carried out in at least two steps under conditions of different pressure in each step with the pressure of the first desorption step being higher than the pressure of the second desorption step so that most of the CO$_2$ adsorbed in the adsorption step is desorbed in the first desorption step and most of the H₂S adsorbed in the adsorption step is desorbed in the second desorption step.

7. A process according to claim 1 in which the process is operated cyclically between the adsorption and desorption conditions with a total cycle time of less than one minute.

8. A process to claim 1 in which the CO₂ and H₂S partial pressures during the adsorption step are less than about 1 bar.

9. A process to claim 1 in which the feed gas mixture contains less than 5 mol % water.

10. A cyclic process for selectively separating H₂S from a natural gas feed stream comprising H₂S and CO₂, which process comprises:
   (i) contacting the natural gas feed stream under H₂S adsorption conditions with a non-aqueous adsorbent comprising a basic non-protogenic, tertiaryaminosiloxane compound grafted onto a mesoporous solid oxide having surface silanol groups selected from MCM-41, MCM-48, SBA-1, SBA-2, SBA-3, SBA-15, KIT-1, KIT-5, KIT-6, and combinations thereof where in the non-aqueous adsorbent has a selectivity for H₂S over CO₂ under the conditions;
   (ii) reacting at least a portion of the H₂S in the natural gas feed stream with the sorbent so that the H₂S is absorbed by the adsorbent;
   (iii) retrieving a natural gas product stream having a lower content of H₂S in mol % than the natural gas feed stream;
   (iv) subjecting the adsorbent containing the adsorbed H₂S to desorption conditions by which at least a portion of the H₂S in the sorbent is desorbed from the sorbent;
   (v) retrieving an H₂S rich product stream that has a higher mol % of H₂S than the natural gas feed stream;
   (vi) passing at least a portion of the H₂S-rich product stream to a Claus plant; and
   (vii) recovering sulfur from the H₂S in a side stream.

11. A process according to claim 10 wherein the natural gas feed stream contains from about 10 vppm to about 10,000 vppm H₂S and wherein the natural gas product stream contains less than about 4 vppm H₂S.

12. A process according to claim 11 wherein the natural gas feed stream contains at least 5 mol % CO₂ and wherein the natural gas product stream contains at most 5 mol % less CO₂ than the natural gas feed stream.

13. A process according to claim 11 in which the adsorption and desorption steps are conducted at different pressures, wherein (a) the total pressure of the desorption step is lower than the total pressure of the adsorption step, (b) the partial pressure of H₂S in the desorption step is less than the partial pressure of H₂S in the adsorption step, or (c) both (a) and (b).

14. A process according to claim 11 in which at least a portion of the sorbed H₂S is desorbed by a non-sorbing inert purge gas and/or by a displacement purge gas.

15. A cyclic process for separating H₂S and CO₂ from a natural gas feed stream comprising H₂S and CO₂, from a producing formation, which process comprises:
   (i) contacting the natural gas feed stream under H₂S adsorption conditions with a non-aqueous adsorbent comprising a basic non-protogenic tertiaryaminosiloxane compound grafted onto a mesoporous solid oxide having surface silanol groups selected from MCM-41, MCM-48, SBA-1, SBA-2, SBA-3, SBA-15, KIT-1, KIT-5, KIT-6, and combinations thereof wherein the non-aqueous adsorbent has a selectivity for H₂S over CO2 under the H₂S adsorption conditions;
   (ii) reacting at least a portion of the H₂S and CO₂ in the natural gas feed stream with the sorbent so that the H₂S and the CO₂ are adsorbed by the adsorbent;
   (iii) retrieving a natural gas product stream having a lower mol % of each H₂S and CO₂ than the natural as feed stream;
   (iv) subjecting the adsorbent containing the adsorbed H₂S and CO₂ to first desorption conditions by which a higher mol % of CO₂ is desorbed than H₂S;
   (v) retrieving a CO₂ rich product stream that has a higher mol % of CO₂ than the natural gas feed stream;
   (vi) subjecting the adsorbent containing the adsorbed H₂S and CO₂ to second desorption conditions by which a higher mol % of H₂S is desorbed than CO₂;
   (vii) retrieving an H₂S-rich product stream that has a higher mol % of H₂S than the natural gas feed stream; and
   (viii) re-injecting the side stream comprising CO₂ into the producing formation.

16. A process according to claim 15 further comprising:
   sending at least a portion of the H₂S-rich stream to a Claus plant; and
   recovering sulfur from the H₂S-rich stream.

17. A cyclic process for separating H₂S and CO₂ from a feed gas stream comprising H₂S and CO₂, to produce a first product gas stream comprising H₂S and a second product gas stream comprising CO₂ depleted in H₂S, which process comprises:
   (i) contacting the feed gas stream under H₂S adsorption conditions with a non-aqueous adsorbent comprising a basic non-protogenic tertiaryaminosiloxane compound grafted onto a mesoporous solid oxide having surface silanol groups selected from MCM-41, MCM-48, SBA-1, SBA-2, SBA-3, SBA-15, KIT-1, KIT-5, KIT-6, and combinations thereof wherein the non-aqueous adsorbent has a selectivity for H₂S over CO₂ under the H₂S adsorption conditions;
   (ii) reacting at least a portion of the H₂S and the CO₂ in the feed gas stream with the adsorbent so that the H₂S and CO₂ are adsorbed by the adsorbent;
   (iii) subjecting the adsorbent containing the adsorbed H₂S and CO₂ to CO₂ desorption conditions by which a higher mol % of the CO₂ is desorbed than H₂S;
   (iv) retrieving a CO₂ rich product stream that has a higher mol % of CO₂ than the feed gas stream;
   (v) subjecting the adsorbent containing the adsorbed H₂S and CO₂ to H₂S desorption conditions by which a higher mol % of H₂S is desorbed than CO₂; and
   (vi) retrieving an H₂S rich product stream that has a higher mol % of H₂S than the feed gas stream.

18. A process according to claim 17 in which the CO₂ rich product stream has a lower mol % of H₂S than the feed gas stream.

19. A process according to claim 18 in which the feed gas stream comprises at least a combined total of 50 mol % H₂S and CO₂, wherein the feed gas stream is a pre-separated contaminant stream resulting from the separation of H₂S and CO₂ from a natural gas stream from a producing formation and the CO₂-rich stream is re-injected into the producing formation.

20. A process according to claim 17 in which at least a portion of the H₂S-rich product stream is passed to a Claus plant for the recovery of sulfur.

* * * * *